(12) United States Patent
Taruguchi et al.

(10) Patent No.: US 6,359,573 B1
(45) Date of Patent: Mar. 19, 2002

(54) METHOD AND SYSTEM FOR EMBEDDING ELECTRONIC WATERMARK INFORMATION IN MAIN INFORMATION

(75) Inventors: Hideaki Taruguchi; Shigeo Tsunoda, both of Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 09/644,090

(22) Filed: Aug. 23, 2000

(30) Foreign Application Priority Data

Aug. 31, 1999 (JP) .......................................... 11-246821

(51) Int. Cl.[7] .............................................. H03M 7/00
(52) U.S. Cl. ............................ 341/50; 341/51; 382/100
(58) Field of Search ............................. 341/50, 51, 55, 341/95, 106; 382/100, 232, 276

(56) References Cited

U.S. PATENT DOCUMENTS 6,259,801 B1 * 7/2001 Wakasu ....................... 382/100

FOREIGN PATENT DOCUMENTS

| GB | 2-314949 | 1/1998 |
|----|----------|--------|
| GB | 233498 | 4/1999 |
| JP | 9-186603 | 7/1997 |
| JP | 11-39796 | 2/1999 |
| JP | 11-265179 | 9/1999 |
| JP | 11-265180 | 9/1999 |
| JP | 11-265181 | 9/1999 |
| JP | 2000132165 | 5/2000 |

OTHER PUBLICATIONS

Japanese Office Action issued Dec. 12, 2000 in a related application with English translation of relevant portions.

* cited by examiner

Primary Examiner—Brian Young
(74) Attorney, Agent, or Firm—Ostrolenk, Faber, Gerb & Soffen, LLP

(57) ABSTRACT

Arrangement/order of data in main information is changed in accordance with a value of additional information and with a predetermined encoding algorithm, and thus an electronic watermark of the additional information is embedded in the form of a change in the arrangement/order of the data without values of the data in the main information being changed. Time information of a plurality of performance data in the main information may be changed in accordance with the value of the additional information so that an electronic watermark of the additional information is embedded in the form of a combination of changes of the time information. Control may be made as to whether particular status information in music performance data should be used or not so that a one-bit electronic watermark corresponding to the use/non-use of the particular status information is embedded. The number of spaces in text data may be controlled so that an electronic watermark of a value corresponding to the number of spaces is embedded.

65 Claims, 18 Drawing Sheets

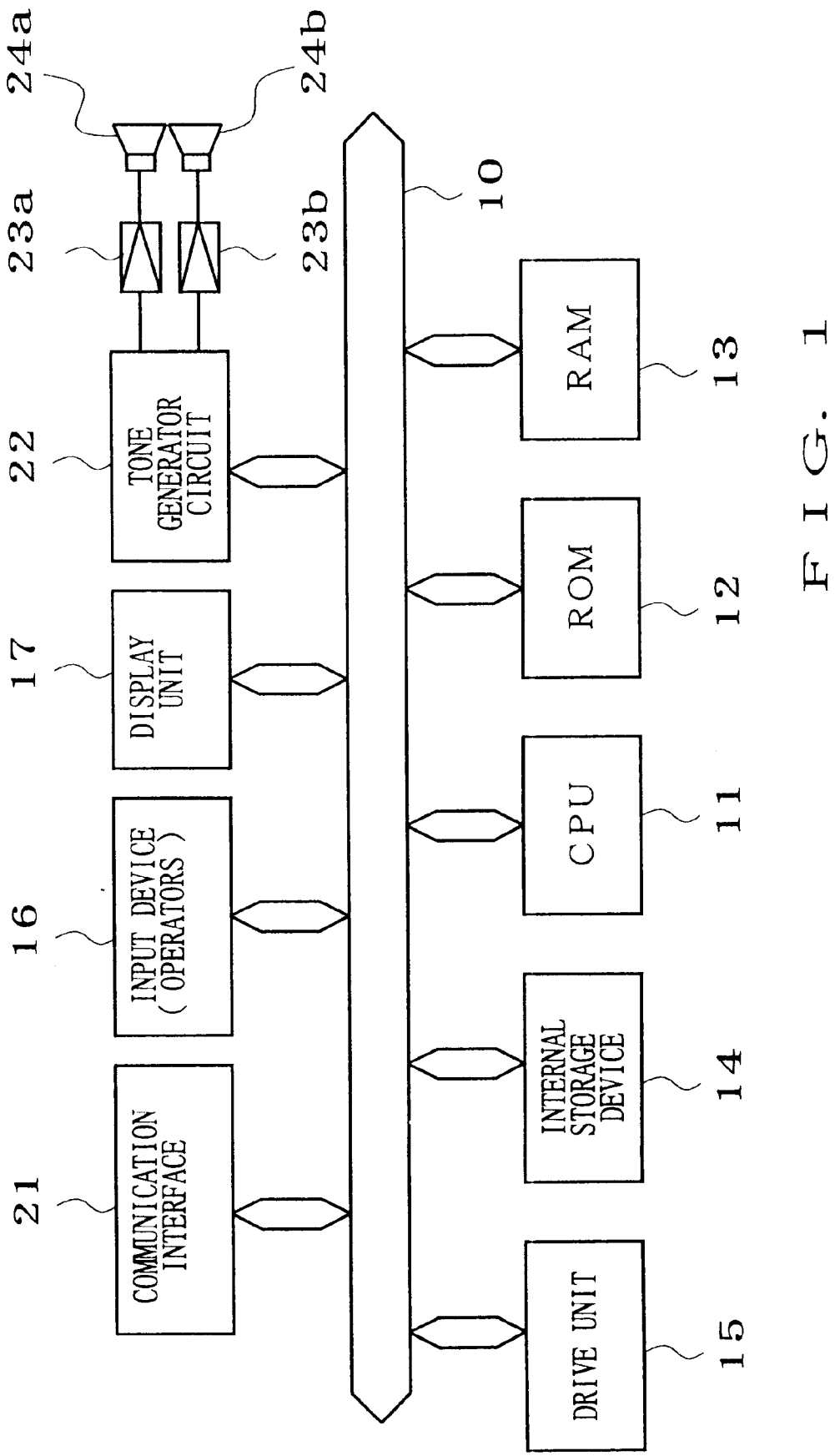
F I G. 1

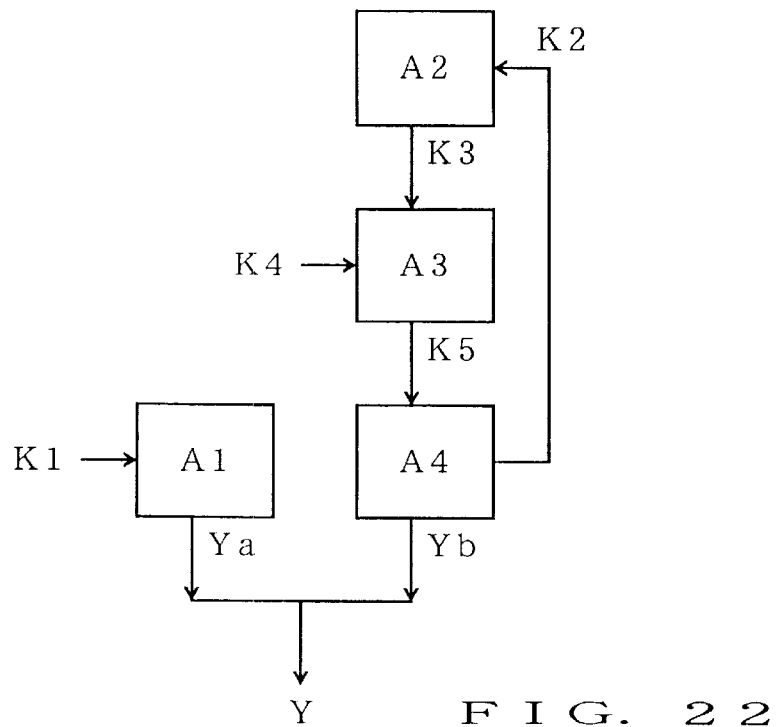
F I G. 2 2
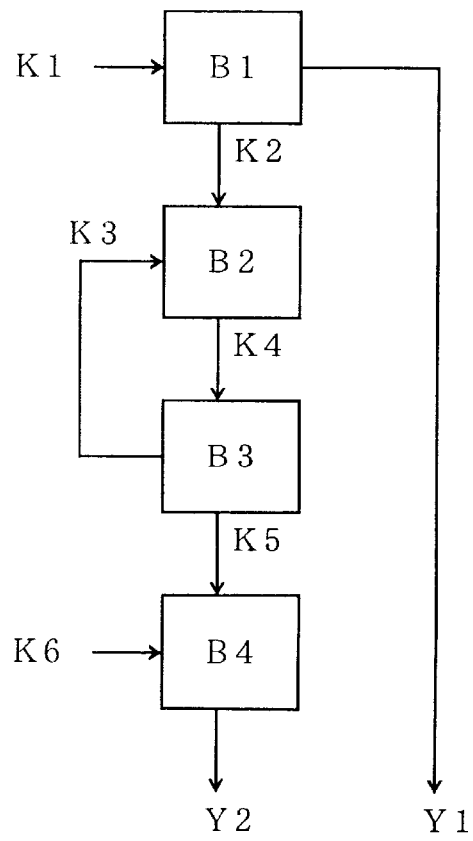
F I G. 2 3

METHOD AND SYSTEM FOR EMBEDDING ELECTRONIC WATERMARK INFORMATION IN MAIN INFORMATION

BACKGROUND OF THE INVENTION

The present invention relates to an electronic information processing method and system for embedding various accessory or additional information, such as information indicative of copyright, name, composer, date of completion and lyrics of a music piece, information indicative of machine model name, news text information and text data like ID data, etc. as electronic watermark information in main information such as performance data, picture information or waveform data, and/or retrieving or taking out additional information embedded as electronic watermark information in main information, as well as a computer-readable storage medium containing programs for implementing the electronic information processing method.

As typically shown in Japanese Patent Laid-open Publication No. HEI-11-39796 (corresponding to U.K. Patent Application Laid-open Publication No. 2,314,949 A), it has been known to embed accessory or additional information, indicative of a name, composer, etc. of a music piece, etc., at respective lowermost bits of individual velocity data included in performance data constituting main information, and then retrieve the embedded additional information from among the performance data. Similar technique is disclosed in U.K. Patent Application Laid-open Publication No. 2,330, 498 A).

However, because the conventionally-known techniques embed the additional information in relatively simple form, there has been the serious problem that the embedding schemes are readily read or seen through by an unauthorized dishonest user and thus the embedded additional information is intentionally (or maliciously) altered by the unauthorized dishonest user. Further, because the velocity data are among those data that can be altered relatively easily, there has been the possibility that the additional information embedded in the velocity data is altered unintentionally or unconsciously by an authorized user as the user alters the velocity data, for example, during editing of the performance data.

SUMMARY OF THE INVENTION

In view of the foregoing, it is an object of the present invention to provide a unique electronic information processing method and system and storage medium where a novel or improved scheme is employed for embedding additional information in main information without the problems encountered by the prior art.

It is another object of the present invention to provide an electronic information processing method and system and storage medium which can effectively prevent additional information from being read or seen through and hence intentionally or maliciously altered by any unauthorized dishonest user.

It is still another object of the present invention to provide an electronic information processing method and system and storage medium which can effectively prevent additional information from being altered unintentionally or unconsciously by an authorized user.

According to a first aspect of the present invention, there is provided a method of embedding additional information, as an electronic watermark, in main information including a plurality of data, which method is characterized by comprising a step of changing arrangement (placement) or order of the data in the main information in accordance with a value of the additional information to be embedded and also with a predetermined encoding algorithm. With this inventive method, the electronic watermark of the additional information is embedded in the form of a change in the arrangement or order of the data, without values of the data in the main information themselves being changed.

The present also provides an improved method of decoding additional information from main information having an electronic watermark embedded therein in accordance with the aforementioned first aspect, which is characterized by comprising: a step of acquiring decoding key information corresponding to the encoding algorithm; and a step of inversely executing the encoding algorithm on the basis of the decoding key information acquired by the step of acquiring, to thereby decode the additional information hidden in the arrangement or order of the data in the main information.

According to the above-mentioned first aspect of the present invention, the electronic watermark corresponding to the additional information is embedded in the form of a change in the arrangement or order of the data without values of the data in the main information themselves being changed at all. With no change in the data values of the main information, the main information can be reproduced quite reliably. In one embodiment, the main information comprises music performance data associated with a plurality of channels, and the change in the arrangement or order of the data in the main information is made by changing the channels of the music performance data, i.e., by changing the correspondency between the channels and the music performance data. Even in the case where the original channel assignment or arrangement in the main information has been changed, reproduction of a music performance based on the performance data can be carried out with no problem because tones to be generated themselves have not been changed at all by the channel rearrangement. However, because particular information hidden in the channel arrangement can not be known unless appropriate key information is obtained, this inventive feature can be very helpful in preventing an unauthorized dishonest user from tampering with or altering the information. Further, since the channel rearrangement in the music performance data generally does not take place very often in ordinary editing of the performance data, it is very unlikely that the additional information is altered unintentionally or unconsciously. The present invention is not limited to the above-mentioned channel rearrangement; for example, the arrangement or order of the data may be changed with respect to a particular factor a change of which does not substantially adversely influence music reproduction based on the music performance data.

According to a second aspect of the present invention, there is provided a method of embedding additional information, as an electronic watermark, in main information including a plurality of performance data, the performance data including time information, which method is characterized by comprising a step of changing the time information of the plurality of performance data in the main information in accordance with a value of the additional information and with a predetermined encoding algorithm. With this inventive method, the electronic watermark of the additional information is embedded in the form of a combination of changes of the time information in the plurality of performance data.

The present invention also provides an improved method of decoding additional information embedded, as an electronic watermark, in main information in accordance with the aforementioned second aspect, which method is characterized by comprising: a step of acquiring decoding key information corresponding to the encoding algorithm; and a step of inversely executing the encoding algorithm on the basis of the decoding key information acquired by the step of acquiring, to thereby decode the additional information hidden in the main information.

According to the second aspect of the present invention, the time information of the plurality of performance data in the main information is changed in accordance with a value of the additional information, and the electronic watermark of the additional information is embedded in the form of a combination of changes (changed states) in the time information of the plurality of performance data. Because the additional information is encoded in very complicated form, the thus-encoded additional information is very insusceptible to alteration by a dishonest user. It is desirable that the time information change be made with respect to such information a time information change of which does not adversely influence a reproductive performance based on the performance data. For example, the time information of plural kinds of tone generator setting information (or tone control information) may be changed. Changing the time information of the tone generator setting information is advantageous in that a not-so-great change in the time information of the tone generator setting information does not substantially influence a reproductive music performance, unlike time information of tone generation instructions (note-on events) and the like. Further, since the time information of the tone generator setting information is not changed very often, it is very unlikely that the additional information is altered unintentionally or unconsciously. Rather than by the above-mentioned time information change, the electronic watermark of the additional information may be embedded by changing duration times, from note-on timing to note-off timing, of a combination of plural tones in accordance with a value of the additional information. Such a duration time change may be made by altering the note-off timing rather than the note-on timing. Not-so-great change of the note-off timing, i.e., duration time, does not have a significant adverse influence on the reproductive music performance.

According to a third aspect of the present invention, there is provided a method of embedding additional information, as an electronic watermark, in main information including music performance data, the music performance data including status information indicative of respective statuses of individual ones of the performance data, which method is characterized by comprising a step of making control as to whether a particular one of the statuses should be used or not, the particular status being a status use/non-use of which has no significant influence on execution of a music performance. With this inventive method, an electronic watermark corresponding to the use/non-use of the particular status is embedded in the main information. Among examples of the particular status, use/non-use of which has no significant influence on execution of a music performance, is a MIDI running status. The MIDI running status indicates a situation where the current status of a given event in a performance sequence is the same as the immediately-preceding status, by omitting status information corresponding to the current status. Thus, where particular status information is omitted, it is indicated that the running status is being used, while where no status information is omitted in a region where a running status is usable, it is indicated that the running status is not being used. Because the use/non-use of the running status does not affect execution of the music performance, e.g., a one-bit electronic watermark can be embedded in the main information without the music performance being adversely influenced by whether the running status is being used or not. Such a feature can effectively diversify the form of the electronic watermark information embedding, and this diversification in the form of the electronic watermark information embedding is very useful in providing for a complicated encoding process with contents very hard to read or see through.

According to a fourth aspect of the present invention, there is provided a method of embedding additional information, as an electronic watermark, in main information including music performance data, the main information including non-performance data in addition to the music performance data, the non-performance data including text data, which method is characterized by comprising a step of controlling the number of spaces in the text data included in the non-performance data. With this inventive method, the electronic watermark of a value corresponding to the number of spaces is embedded in the main information. The "non-performance data" are, for example, MIDI meta event data. For instance, a total number of spaces in text data included in one meta event may be set in accordance with a desired value of the additional information. In an alternative, a total number of spaces between adjoining words in text data included in one meta event is set in accordance with a desired value of the additional information. In this way, an electronic watermark of a certain number of bits can be embedded in the main information. Because an increase/decrease in the number of spaces in the text data of the non-performance data does not affect a music performance, an electronic watermark of an appropriate number of bits can be embedded without the music performance being adversely influenced by embedding of the electronic watermark. Such a feature too can effectively diversify the form of the electronic watermark information embedding, and this diversification in the form of the electronic watermark information embedding is very useful in providing for a complicated encoding process with contents very hard to read or see through.

According to a fifth aspect of the present invention, there is provided an electronic information processing method of embedding additional information, as an electronic watermark, in main information including music performance data, which method is characterized by comprising a step of adding dummy data to the main information in accordance with a predetermined encoding algorithm. With this inventive method, an electronic watermark corresponding to the dummy data added to the main information is embedded in the main information. As an example, dummy data may be added right after given performance control data or non-performance data by duplicating or repeating the same performance control data or non-performance data. For example, even where two or more identical performance control data, instructing that a given effect should be changed to another effect, are arranged in succession, this redundant arrangement of the identical control data does not adversely influence a music performance, because the effect is changed only once in response to the first occurrence of the performance control data and the changed effect is maintained in the next occurrence of the performance control data. Therefore, such performance control data can be used appropriately as the dummy data. Even when identical non-performance data, such as meta events, are arranged in succession, a same meta event process is performed for each of the non-performance data, and the redundant placement of the identical non-performance data does not adversely influence the music performance. Thus, in this case too, one-bit electronic watermark information can be embedded depending on the presence/absence of the dummy data without the music performance being adversely influenced by the embedding. Further, by setting time information indicative of a time position of the dummy data in accordance with desired additional information, it is possible to embed the additional information of a value corresponding to the time information. As another example, a desired one of a plurality of tone generator channels may be set as a dummy channel that is not used for tone generation purposes, and the electronic watermark of a value corresponding to the thus-set dummy channel may be embedded in the main information. In this case too, the form of the electronic watermark information embedding can be highly diversified, which is very useful for constructing a complicated encoding process with contents very hard to read or see through.

According to a sixth aspect of the present invention, there is provided an electronic information processing method of embedding additional information, as an electronic watermark, in main information including music performance data, which method is characterized by comprising a step of selectively changing values of a predetermined kind of data among the music performance data in such a manner that a statistical distribution of the predetermined kind of data presents a pattern changed in accordance with a value of additional information to be embedded. With this inventive method, the additional information is embedded as the electronic watermark with the statistical distribution of the predetermined kind of data presenting the changed pattern. Because this electronic information processing method is designed to change a statistical distribution pattern of predetermined performance data, it can effectively aid in preventing an unauthorized user from tampering with or altering the information and can also appropriately deal with unintentional alteration, by an authorized user, of the additional information, because there is only a low possibility of the statistical distribution pattern greatly changing even when part of the performance data is tampered with or altered through editing whether intentionally or unintentionally. Further, this method too can significantly diversify the form of embedding of the electronic watermark information, which is very useful for building a complicated encoding process with contents very hard to read or see through.

According to a seventh aspect of the present invention, there is provided an electronic information processing method of embedding additional information, as an electronic watermark, in main information, which method is characterized by comprising a step of embedding a plurality of pieces of electronic watermark information in relation to a single item of additional information. Thus, an electronic watermark of a single item of additional information is embedded in the form of a plurality of pieces of electronic watermark information related to each other. This method too can even further enhance the effect of the electronic watermark and therefore is very useful for building a complicated encoding process with contents very hard to read or see through. Also, it is possible to increase the number of bits in each item of additional information that can be imparted to the main information, thereby increasing a total information amount in the impartable additional information.

As an example, one of the pieces of electronic watermark information may be embedded per divided additional information portion that is obtained by dividing, into a plurality of portions, the single item of additional information to be embedded. In this case, the additional information is reproduced by decoding the plural pieces of electronic watermark information from the main information and then combining the divided additional information portions corresponding to the decoded electronic watermark information.

As another example, at least a part of the additional information may be embedded as first electronic watermark information in the main information in accordance with a predetermined first encoding algorithm, while decoding key information, corresponding to the first encoding algorithm, is embedded as second electronic watermark information in the main information. In this case, the additional information is reproduced by decoding the second electronic watermark information from the main information and then decoding the first electronic watermark information from the main information using the second electronic watermark information as the decoding key information.

The present invention may be implemented not only as the method invention as set forth above but also as a system or apparatus invention. The present invention may also be practiced as a computer-readable storage medium storing a program for carrying out the inventive method. Also, the present invention may be practiced as a computer-readable storage medium containing data having electronic watermarks embedded therein.

BRIEF DESCRIPTION OF THE DRAWINGS

For better understanding of the object and other features of the present invention, its preferred embodiments will be described in greater detail hereinbelow with reference to the accompanying drawings, in which:

FIG. 1 is a block diagram showing a general hardware organization of a personal computer apparatus for use with various preferred embodiments of the present invention;

FIG. 22 is a block diagram showing inter-algorithmic connections in a decoding program in accordance with the seventh embodiment of the present invention; and FIG. 23 is a block diagram showing inter-algorithmic connections in another example of the decoding program in accordance with the seventh embodiment of the present invention.

DETAILED DESCRIPTION OF THE PREFERRED EMBODIMENTS

Figure 2A:
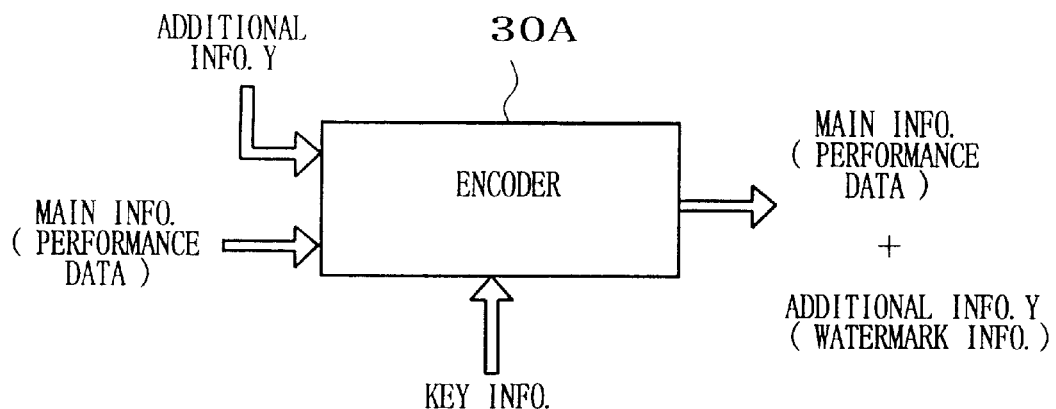
FIG. 2A is a functional block diagram explanatory of an encoding function of the personal computer apparatus of FIG. 1.

FIG. 1 is a block diagram showing a general hardware organization of a personal computer apparatus that is suitably employed in various embodiments of the present invention to be described hereinbelow.

The personal computer apparatus includes a CPU 11, a ROM 12 and a RAM 13 which together constitute a body of a microcomputer. The CPU 12 runs various programs. The ROM 12 provides storage areas storing basic programs such as an OS (Operating System), and the RAM 13 provides storage areas for storing various application programs etc. and various variables necessary for execution of the programs. These CPU 11, ROM 12 and RAM 12 are connected to a bus 10, to which are also connected an internal storage device 14, a drive unit 15, an input device 16 and a display unit 17.

The internal storage device 14 includes a hard disk and a drive therefor, etc. to function as a large-capacity memory device. External storage media, such as a compact disk or flexible disk, can be attached to the drive unit 15 so that the drive unit 15 writes and reads a program and data to and from the storage media. The input device 16 includes a keyboard having a plurality of operators, a mouse, etc. for inputting instructions, data and the like from external sources to the computer apparatus. The display unit 17 visually presents letters, numbers, etc. on its screen.

To the bus 10, there are also connected a communication interface 21 and a tone generator (T.G.) circuit 22. The communication interface 21 is provided for exchanging data and program between the computer apparatus of FIG. 1 and various external equipment via a cable, telephone line or the like; particularly, the communication interface 21 includes an interface circuit for communication of MIDI (Musical Instrument Digital Interface) data. Of course, data of any other desired format than the MIDI data can be communicated via the communication interface 21. The tone generator circuit 22 includes a plurality of tone generator channels (in the illustrated embodiment, 16 channels of channel numbers 0–15) for generating and outputting tone signals. Each of the tone generator channels is capable of generating tone signals of various tone pitches and colors in accordance with performance data such as key codes KC, key-on signals KON, key-off signals KOF and tone control parameters, and the thus-generated tone signals are output via left and right audio channels. Each of the tone generator channels is also capable of synthesizing and outputting a plurality of tone signals on a time-divisional basis. Note that a selected one of the tone generator channels (in the illustrated embodiment, the number-9 tone generator channel) are dedicated to synthesizing tone signals of various percussion instruments and a percussion instrument number, in place of a key code KC, is given to the selected tone generator channel. To the tone generator circuit 22 are connected left and right audio speakers 24a and 24b via left and right audio amplifiers 23a and 23b.

The following paragraphs describe behavior common to the various embodiments of the present invention. User prepares a storage media, such as a compact disk or flexible disk, having stored thereon an "encoding program" and a "decoding program" as application programs, and attaches or connects the storage media to the drive unit 15 so as to store the encoding program and decoding program in the internal storage device 14. Alternatively, the encoding program and decoding program may be stored in the internal storage device 14 via the communication interface 21.

Once the encoding program is activated, the personal computer apparatus of FIG. 1 functions as an encoder 30A as schematically shown in FIG. 2A. The encoder 30A receives key information KEY and accessory or additional information Y from an external source. Thus, the encoder 30A processes given main information (which, in each of the embodiments, comprises performance data) in accordance with the key information KEY and embeds the accessory or additional information Y as electronic watermark information in the main information. The operation for embedding the additional information Y (electronic watermark information) may be performed, on a real time basis, on the main information that is supplied in a data-stream fashion on a real-time basis via the communication interface 21. In an alternative, the embedding operation may be performed, on a non-real-time basis, on the main information prestored in the RAM 13 or internal storage device 14 (or read out from the external storage media via the drive unit 15).

Figure 2B:
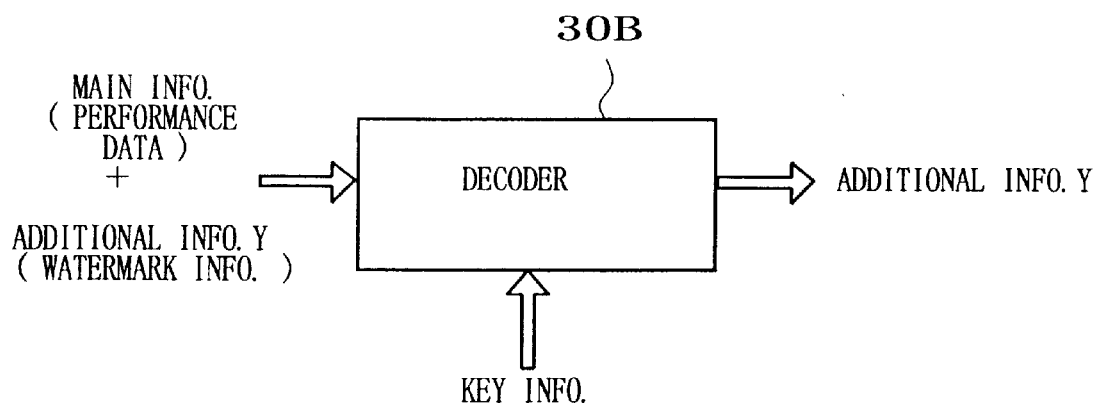
FIG. 2B is a functional block diagram explanatory of a decoding function of the personal computer apparatus.

Once the decoding program is activated, on the other hand, the personal computer apparatus functions as a decoder 30B as schematically shown in FIG. 2B. The decoder 30B receives key information KEY from the external source and uses the key information KEY to retrieve the additional information Y out of the main information (performance data) having the additional information Y embedded therein. The operation for decoding the additional information Y (electronic watermark information) may also be performed, on the real time basis, on the main information that is supplied in data streaming in real time via the communication interface 21. In an alternative, the decoding operation may be performed, on the non-real-time basis, on the main information prestored in the RAM 13 or internal storage device 14 (or read out from the external storage media via the drive unit 15).

Whereas each of the preferred embodiments will be described as using the personal computer to perform the encoding and decoding functions, the principles of the present invention can be applied to a tone generator apparatus, keyboard apparatus for electronic musical instrument, sequencer, MIDI filer, sampler or musical instrument system containing two or more of these as long as a microcomputer device capable of loading programs for implementing the encoding and decoding functions is incorporated therein. Further, although each of the preferred embodiments will be described only relation to the case where the additional information Y is embedded in performance data, the principles of the present invention can also be applied to cases where the additional information Y is embedded in other data than the performance data, such as waveform data or video or picture data.

[First Embodiment]

Now, a first preferred embodiment of the present invention will be described, where data arrangement or order in performance data is changed in accordance with key information KEY.

Before going to a detailed description as to a manner in which the additional information Y is embedded (encoded) in and retrieved (decoded) from the performance data, a brief description will be first made about an exemplary format of the performance data before the additional information Y is embedded therein. As the performance data corresponding to one music performance, performance data sets 0–15 for 16 channels are prestored in correspondence with a total of 16 tone generator channels (ch0–ch15), as illustratively shown in FIG. 3; that is, in the illustrated example, the performance data sets are 16-channel polyphonic automatic performance sequence data sets. It should however be appreciated that it is not necessary to use all of performance data sets 0–15 for the 16 channels and only the performance data sets for some of the channels may be used; for example, only tone generator channels 0–10 may be used and only performance data sets 0–10 for a total of 11 channels may be prepared. Because tone generator channels 0–8 and 10–15 (ch0–ch8 and ch10–ch15) are used for synthesizing tone signals of various tone pitches and colors, performance data sets 0–8 and performance data sets 10–15 are prepared in the same format. However, tone generator channel 9 (ch9) is used for synthesizing a percussion instrument tone signal, performance data set 9 for channel 9 differ in format from the performance data sets for the other channels. Because the instant embodiment is designed to not embed electronic watermark information in performance data set 9 for channel ch9, this performance data set 9 will not be described any further.

Figure 3:
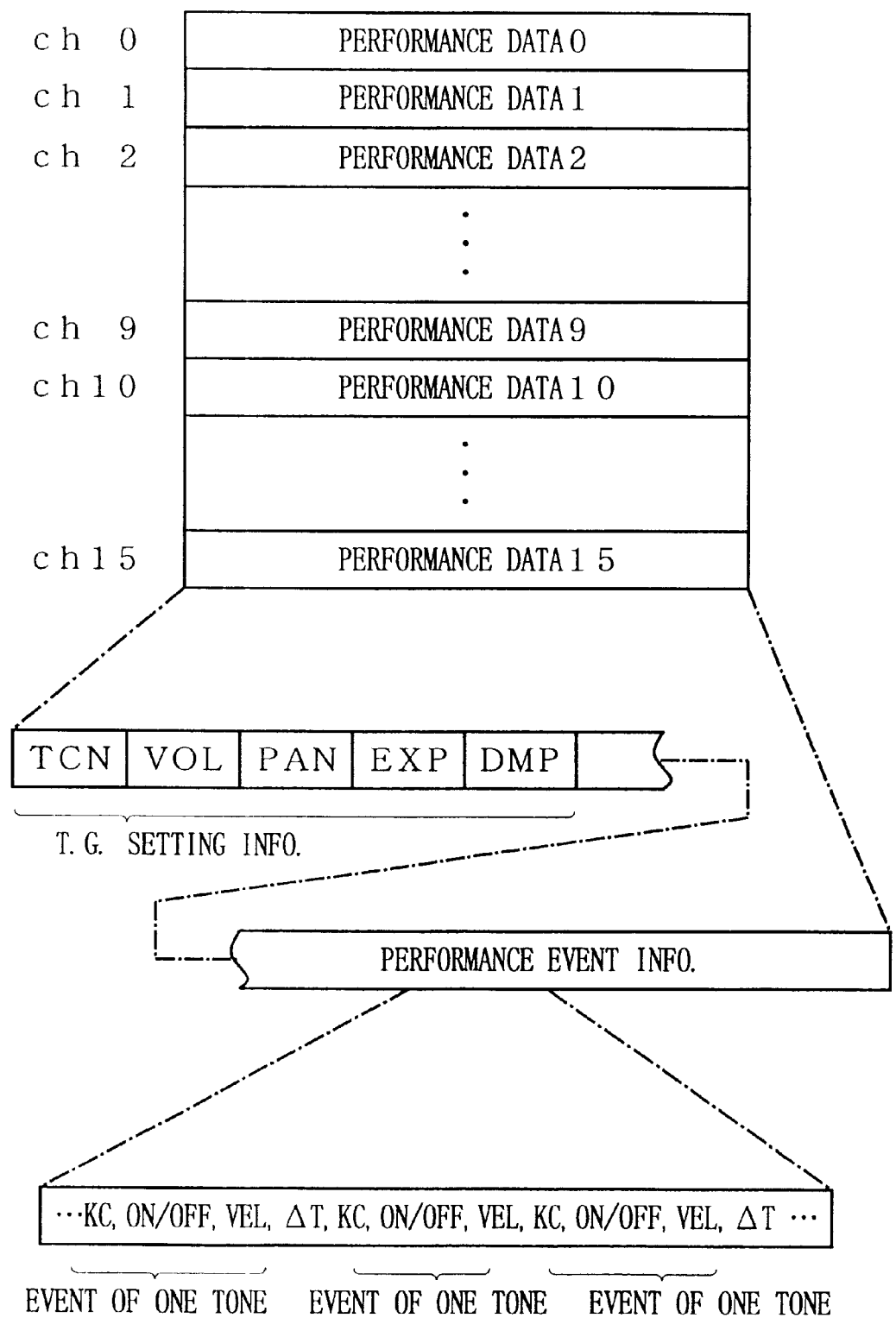
FIG. 3 is a diagram explanatory of an exemplary format of performance data handled by the personal computer apparatus of FIG. 1.

Describing an exemplary format of performance data sets 0–8 and performance data sets 10–15 stored in correspondence with tone generator channels 0–8 and 10–15 (ch0–ch8 and ch10–ch15) with reference to FIG. 3, each of these performance data sets includes tone generator (T.G.) setting information provided at the beginning of the data set and performance event information following the tone generator setting information. The tone generator (T.G.) setting information in each of the performance data sets includes tone color number data TCN, volume data VOL, panning data PAN, expression data EXP and damping data DMP for controlling an initial tone color, tone volume, tone image position, expression pedal position and tone attenuation time in the corresponding tone generator channel; note that the expression pedal position is also for controlling the tone volume and the tone attenuation time sometimes just indicates a length of the attenuation time. For example, the tone color number data TCN may be in the form of any one of integral numbers not smaller than "0" to represent various tone colors such as piano and guitar.

The performance event information In each of the performance data sets includes event data EVT each indicative of an event, such as a start or end of sounding for a tone, and interval data ΔT each indicative of a time interval (relative time difference) between adjoining events. More specifically, each of the event data EVT is composed of a set of a key code KC indicative of a pitch name (e.g., C2 or E2) of the tone, on/off data ON/OFF indicative of a start or end of sounding for the tone, velocity data VEL indicative of the key touch intensity, etc. Note that where a plurality of events occur at same timing, a plurality of event data EVT are written in succession.

Reproduction of such performance data will be briefed below. First, the tone color number data TCN, volume data VOL, panning data PAN, expression data EXP and damping data DMP constituting the tone generator setting information are sequentially read out and supplied to the corresponding tone generator channel of the tone generator circuit 22, by execution of a not-shown program. Then, the tone generator channel of the tone generator circuit 22 sets an initial tone color, volume, tone image position, expression pedal position and tone attenuation time of the tone signal to be generated in the channel, in response to the data TCN, VOL, PAN, EXP and DMP. After that, the various data of the performance event information are read out sequentially. In this case, the event data EVT continue to be read out until the next interval data ΔT is read out; that is, if a plurality of sets of the event data EVT are present before the next interval data ΔT, then these sets of the event data EVT are read out in succession. The thus-read-out event data EVT are then delivered to the corresponding tone generator channel of the tone generator circuit 22. After that, the readout of the performance event information is suspended until the time indicated by the next interval data ΔT has elapsed (i.e., counting of the indicated time has been completed). Upon completion of the counting of the indicated time, the readout of the performance event information is resumed. Thus, the event data EVT are read out sequentially per time indicated by the interval data ΔT and supplied to the corresponding tone generator channel of the tone generator circuit 22.

The tone generator channel of the tone generator circuit 22 synthesizes a tone signal of the pitch designated by the key code KC included in the supplied event data EVT. Start and end of sounding of the thus-synthesized tone signal are controlled by the on/off data ON/OFF included in the supplied event data EVT, and the tone volume of the thus-synthesized tone signal is controlled by the velocity data VEL included in the supplied event data EVT. Further, the tone color, total volume, tone image position, volume specified via the expression pedal position and tone attenuation time of the synthesized tone signal are controlled respectively by the tone color number data TCN, volume data VOL, panning data PAN, expression data EXP and damping data DMP constituting the tone generator setting information. However, in a situation where any of these data TCN, VOL, PAN, EXP and DMP is included in the performance data set and read out during the course of the readout of the performance event information, the tone color, total volume, tone image position, volume specified via the expression pedal position or tone attenuation time of the synthesized tone signal is controlled by that read-out data from the readout time point onward.

Note that FIG. 3 shows the performance data format only conceptually and details of the performance data format employed in the present invention are similar to any of the known formats of music performance data. For example, in the case where the performance data sets are in the conventional automatic performance sequence format with a separate performance data recording track provided for each of the tone generator channels, the tone generator channels correspond to the performance data recording tracks on a one-to-one basis. Therefore, in such a case, the channel arrangement or assignment of the performance data may be changed either by transferring a selected one of the performance data sets recorded in the recording track of a particular one of the tone generator channels to the recording track of another tone generator channel, or by changing the correspondence between the tone generator channels and the recording tracks (i.e., changing the channel number associated with a particular one of the recording tracks to another channel number). Further, in the case where the performance data sets are in the format where channel number data are each included in a status byte as in a conventional MIDI message, the performance data (MIDI data) sets for the plurality of tone generator channels are stored mixedly rather than separately in association with the recording tracks; in that case, the channel arrangement of the performance data is changed by changing the channel number of the status byte.

Figure 4:
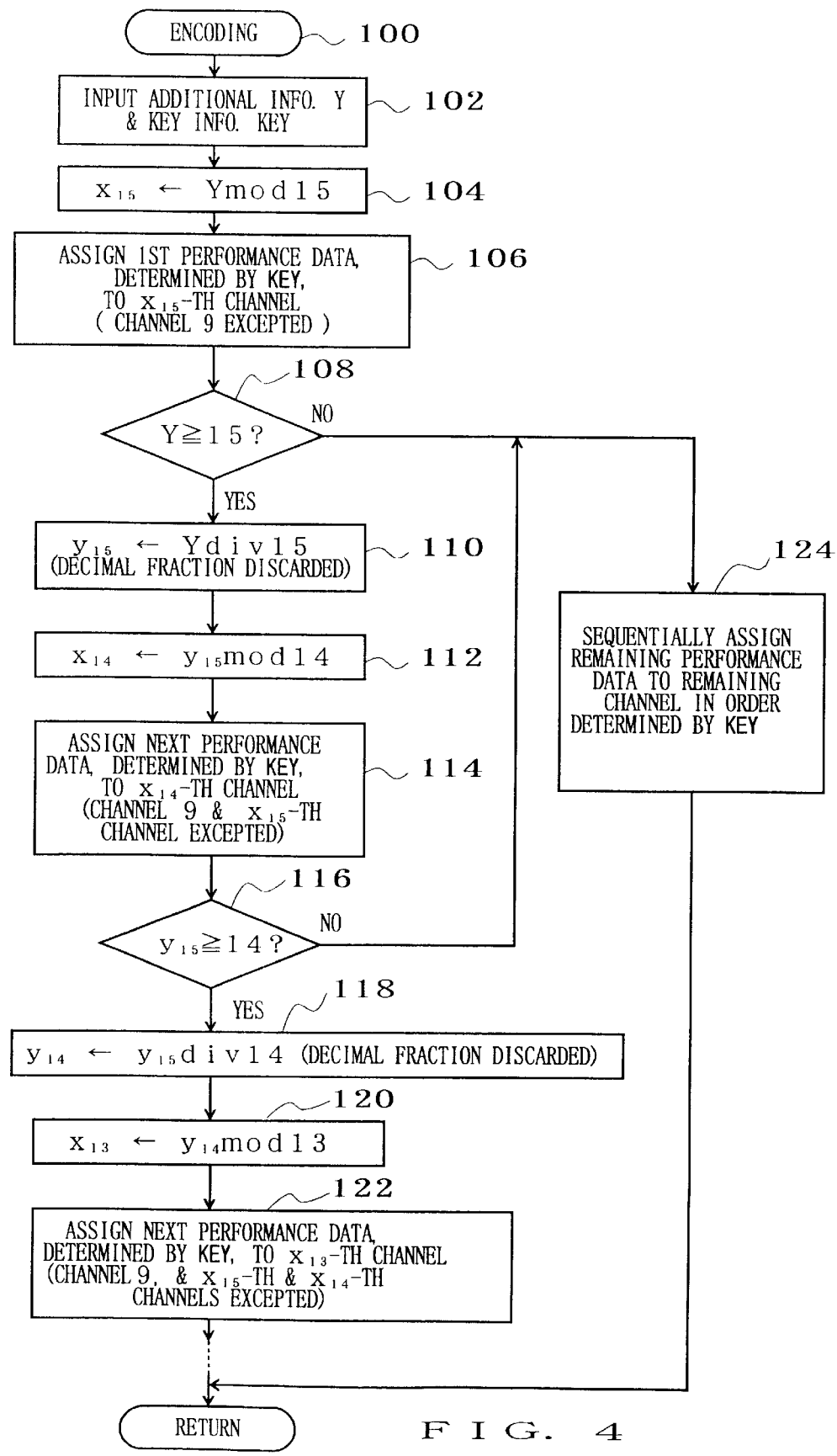
FIG. 4 is a flow chart of an encoding program in accordance with the first embodiment of the present invention.

Now, a description will be made about an example of a process for embedding (encoding) additional information Y in performance data, with reference to FIG. 4. More specifically, FIG. 4 is a flow chart showing a case where electronic watermark information corresponding to desired additional information Y is embedded by changing the channel arrangement or assignment of the performance data. In this case, tone color information is used as a "key" in an encoding algorithm for changing the channel arrangement of the performance data; that is, an encoding algorithm for changing the channel arrangement of the performance data is used here in relation to the tone color information. It should be appreciated that the encoding algorithm may be designed in any desired manner other than the one illustrated here.

In FIG. 4, once the user makes a necessary operation for starting up the encoding program, the CPU 11 starts running the encoding program at step 100 and then goes to step 102 in order to input additional information Y and decoding key information KEY to the personal computer apparatus. Specifically, these additional information Y and decoding key information KEY may be input by a user's input operation on the input device 16, from an external source via the communication interface 21, from the internal storage device 14, or in any other appropriate manner.

For clear understanding, the following paragraphs describe a simplest example where numeric information indicative of a single letter code is embedded as the additional information Y. To further ease understanding, let's assume here that a value "86" in the decimal notation is embedded to represent a letter "Y" in ASCII code. Let's also assume that as the "key" in the additional-information encoding algorithm, the channels of the performance data sets are rearranged or reordered (i.e., the places or positions of the channels are changed) in accordance with the ascending order of the tone color numbers TCN included in the respective tone generator setting information of the performance data sets for channels 0–8 and 10–15. The key information KEY is representative of a key to the channel rearrangement. Note that all numerical values appearing in the following description are in the decimal notation unless specified otherwise.

Basically, encoding algorithms are used that sets permutational positions of "B" data in accordance with a numerical value "A" capable of taking any one of "B!" different values at the maximum. Specifically, such encoding algorithms may be expressed as follows.

(Mathematical Expression 1)
Position 0 in B Permutation: AmodB
Position 1 in B Permutation: (AdivB)mod(B−1)
Position 2 in B Permutation:{(AdivB)div(B−1)}mod (B−2)
Position B−2 in B Permutation:[{(AdivB)div(B−1)} div . . . div3] mod 2
Position B−1 in B Permutation:[{(AdivB)div(B−1)} div . . . div2] mod 1=0

In Mathematical Expression 1 above, "AmodB" represents a remainder left over in division of numerical value A by B, and "AdivB" represents an integral portion of a quotient calculated by dividing numerical value A by B. For example, "position 0 in B permutation" represents original position 0 in B permutation which is an uppermost position in the permutation, and encoded output "AmodB" represents a position as changed (after-change position). Here, an after-change position represented by an encoded output via a lower-position encoding algorithm is a position from which a position determined by an upper-position encoding algorithm has been excluded or excepted. For example, when it has been determined by the uppermost-position encoding algorithm "AmodB" that the data at position 0, in the original order, of B permutation is to be changed to position "3" in the entire position group and if the next encoding algorithm "(AdivB)mod(B−1)" has calculated an encoded output "4", it means that the data at position 1, in the original order, of B permutation is to be changed to the fourth position in the order from which the already-determined position "3" has been excepted, i.e., position "5" in the entire position group. In this manner, other after-change positions are sequentially determined by excluding each already-determined position. Here, the "original order" is one represented by the key information KEY; for example, in the case of the encoding algorithm that is designed to rearrange or reorder (i.e., change the positions of) the channels of the performance data sets in accordance with the ascending order of the tone color numbers TCN, the original order is set to coincide with the ascending order of the tone color numbers TCN assigned to the individual tone generator channels. Note that once the calculated result of the encoding algorithm of a given position has yielded a zero remainder, the arithmetic operations based on the encoding algorithms of lower positions than the given position may be omitted and the lower positions may be left unchanged from those in the original order represented by the key information KEY.

At step 104 of FIG. 4, the additional information Y to be embedded is processed by the algorithm of position 0 according to Mathematical Expression 1 above. Because the total number of the channels to be subjected to the channel rearrangement is 15 in this case, "B" in Mathematical Expression 1 is 15 (B=15). Further, because the numerical value to be encoded is that of the additional information Y, A in Mathematical Expression 1 is Y (A=Y). Thus, at step 104, an arithmetic operation of "Ymod15" is performed as the "AmodB", and the resultant remainder will hereinafter be represented by $x_{15}$; for example, when Y=86, the remainder $x_{15}$ is "11". At next step 106, the first performance data set determined by the key information KEY, i.e., the performance data set having the smallest tone color number TCN, is assigned to the $x_{15}$-th tone generator channel among available tone generator channels 0–8 and 10–15, with tone generator channel 9 (percussion instrument channel) excepted, as counted from tone generator channel 0 as the highest-position channel; that is, the first performance data set is assigned to tone generator channel 12. Namely, when $x_{15}$=11, the order of the tone generator channels up to the $x_{15}$-th (=11th) channel is "ch0, ch1, ch2, ch3, ch4, ch5, ch6, ch7, ch8, ch10, ch11, ch12" because tone generator channel 9 (ch9) is excluded, and channel 12 becomes the $x_{15}$-th channel in this example. Note that the 0th, 1st, 2nd, 3rd, . . . channels represent channels 0, 1, 2, 3, . . . , respectively. Further, assigning the performance data set having the smallest tone color number TCN to the $x_{15}$-th tone generator channel means replacing the performance data set of the original $x_{15}$-th tone generator channel with the performance data set having the smallest tone color number TCN— however, no such rearrangement takes place if the performance data set of the original $x_{15}$-th tone generator channel coincide with the performance data set having the smallest tone color number TCN. In this way, the performance data set having the smallest tone color number TCN become the performance data set of the $x_{15}$-th tone generator channel as counted from channel 0.

At following step 108, a determination is made as to whether the additional information Y is a value equal to or greater than "15". With an affirmative (YES) answer at step 108, the program proceeds to steps 110–114. At steps 110 and 112, an arithmetic operation is performed according to the encoding algorithm of position 1 in Mathematical Expression 1 above. More specifically, step 110 determines an integral portion of a quotient obtained by dividing the additional information Y by "15" (this integral portion will be represented by $y_{15}$). The arithmetic operation performed here corresponds to the division of "AdivB" in Mathematical Expression 1 above. If A=Y and B=15 as in the example noted above, then division of "Ydiv15" is performed at this step 110. Then, at step 112, the integral portion $y_{15}$ of the quotient is divided by "14" to determine a remainder $X_{14}$. Namely, $X_{14}=y_{15}$mod14, which corresponds to a solution to the arithmetic operation of position 1 in Mathematical Expression 1 above. At next step 114, the next performance data set, i.e. the performance data set having the second smallest tone color number TCN, are assigned, in accordance with the key information KEY, to the $x_{14}$-th tone generator channel among available tone generator channels 0–8 and 10–15 with the already-determined tone generator channel $x_{15}$ excepted. For example, when Y=86, $y_{15}$=5, and $x_{14}$ equals "5" because 5÷14=0 with a remainder 5. Namely, the performance data set having the second smallest tone color number TCN are assigned to the $x_{14}$-th tone generator channel (channel 5 when $x_{14}$=5) among the available tone generator channels with channel 9 and "$x_{15}$(=11)th" channel (i.e. channel 12) excepted.

At next step 116, a determination is made as to whether the integral portion $y_{15}$ of the quotient is a value equal to or greater than "14". With an affirmative answer at step 116, the program proceeds to steps 118–122. At steps 118 and 120, an arithmetic operation is performed according to the encoding algorithm of position 2 in Mathematical Expression 1 above. More specifically, step 118 determines an integral portion of a quotient obtained by dividing $y_{15}$ by "14" (this integral portion will be represented by $y_{14}$). The arithmetic operation performed here corresponds to the division of "AdivB(B− 1)" in Mathematical Expression 1. If AdivB=$y_{15}$ and B−1= 14 as in the example noted above, then division of "$y_{15}$div14" is performed at step 118. Then, at step 120, the integral portion $y_{14}$ of the quotient is divided by "13" to determine a remainder $X_{13}$. Namely, $X_{13}=y_{14}$mod13, which corresponds to a solution to the arithmetic operation of position 2 in Mathematical Expression 1 above. At next step 120, the next performance data set, i.e. the performance data set having the third smallest tone color number TCN, are assigned, in accordance with the key information KEY, to the $x_{13}$-th tone generator channel among available tone generator channels 0–8 and 10–15 with the already-determined $x_{15}$-th and $x_{14}$-th tone generator channels and channel 9 excepted.

Subsequently, the operations of steps 116, 118, 120 and 122 are sequentially repeated with the position of the encoding algorithm sequentially lowered, in order to carry out the arithmetic operations according to the encoding algorithms of position 3 to position B−1 in Mathematical Expression 1 above.

If, however, Y=86, $y_{15}$ is "5", so that a negative (NO) determination is made at step 116 and the program branches to step 124 instead of proceeding to steps 118–122. At step 124, the remaining performance data sets are assigned to the remaining available tone generator channels in accordance with the order determined by the key information KEY. For such segments where the tone generator channels are placed exactly in the same order as determined by the key information KEY, the solution, i.e. remainder, of the encoding algorithm is "0". Namely, because there is no need to sequentially repeat the operations of steps 116, 118, 120 and 122 while sequentially lowering the position of the encoding algorithm, these arithmetic operations are omitted or dispensed with here, and it suffices to only perform the sequential assignment operation at step 124. For a similar reason, the program also goes to step 124 when a negative determination has been made at step 108.

To promote better understanding, a more specific example of the channel rearrangement or reassignment in the present invention will be set forth below. Let it be assumed here that as original performance data sets, the performance data set of tone color number 20 is currently assigned to channel 0, the performance data set of tone color number 10 to channel 3, the performance data set of tone color number 15 to channel 5, and the performance data set of tone color number 12 to channel 10. If the additional information Y to be embedded is a value "86" as in the example noted above, the smallest tone color number, i.e. tone color number 10, is first relocated (reassigned) in accordance with the key information KEY indicating an algorithm of tone color number order. That is, the performance data set having tone color number 10 is reassigned or relocated, at step 104, from original channel 3 to the position-11 channel (i.e. channel 12) in accordance with "$x_{15}$=Ymod15=11".

Next, the second smallest tone color number, i.e. tone color number 12, is relocate d (reassigned). That is, the performance data set having tone color number 12 is reassigned or relocated from original channel 10 to channel 5 in accordance with "$y_{15}$=Ydiv15=5" at step 110 and "$x_{14}$= $y_{15}$mod14=5" at step 112. Because $y_{15}$ is a value smaller than 14, a negative determination is made at step 116, so that the program branches to step 124, without performing the subsequent encoding arithmetic operations, in order to sequentially assign the remaining tone colors to the remaining available channels in accordance with the order of tone color numbers. Namely, the performance data set having the third tone color, i.e. tone color number 15, is reassigned or relocated from original channel 5 to channel 0, and the performance data set having the fourth tone color number, i.e. tone color number 20, is reassigned or relocated from original channel 0 to channel 1.

According to the encoding algorithms based on the channel rearrangement as set forth above, if the number of the channels to be subjected to the rearrangement is "15", "15!" different permutational combinations of the channel arrangement are possible, so that additional information indicative of any one of "15!" different values corresponding to the "15!" permutations can be embedded, as electronic watermark information, in the performance data (i.e., main information). The additional information capable of taking any one of "15!" different values consist of "log15!" (with a base of "2") bits, from which it will be understood that a considerable amount of information can be embedded as the electronic watermark information. In addition, even though the assignment of the performance data sets to the channels is changed in the above-mentioned manner, no change is made to performance tones to be eventually sounded (it is only necessary that the performance tones be sounded with designated tone colors etc. no matter which channels are used for the sounding); thus, embedding the electronic watermark information will, in no way, adversely influence the reproductive performance of the tones and the inventive technique will prove extremely advantageous.

It should also be appreciated that any other desired factor than the order of tone color numbers may be used as the key information KEY of the encoding algorithms for the channel rearrangement. For example, the key information KEY may be an ascending (or descending) order of average values of note numbers present in the performance data sets of the individual channels, an ascending (or descending) order of total numbers of notes present in the performance data sets of the individual channels, or any other suitable factor. Further, whereas the first embodiment has been described as embedding an ASCII code of a single letter as the additional information Y, it should be obvious that desired letter information representing a plurality of letters, picture information or any other suitable information may be embedded as the additional information Y. For instance, the encoding may be performed by embedding watermark information of a plurality of letters in the music performance data set, one letter per appropriate block (every one or more measures) of the performance data set. In such a case, it is assumed that various information necessary for a subsequent decoding process, such as one indicating where the channel arrangement changes, is supplied as the key information KEY if appropriate.

Next, a description will be made about an example of the process for decoding the additional information Y embedded in the performance data, with reference to FIG. 5. More specifically, FIG. 5 shows a case where the additional information Y is decoded from the performance data which has electronic watermark information, corresponding to the desired additional information, embedded therein by changing the channel arrangement in accordance with the encoding scheme of FIG. 4.

Figure 5:
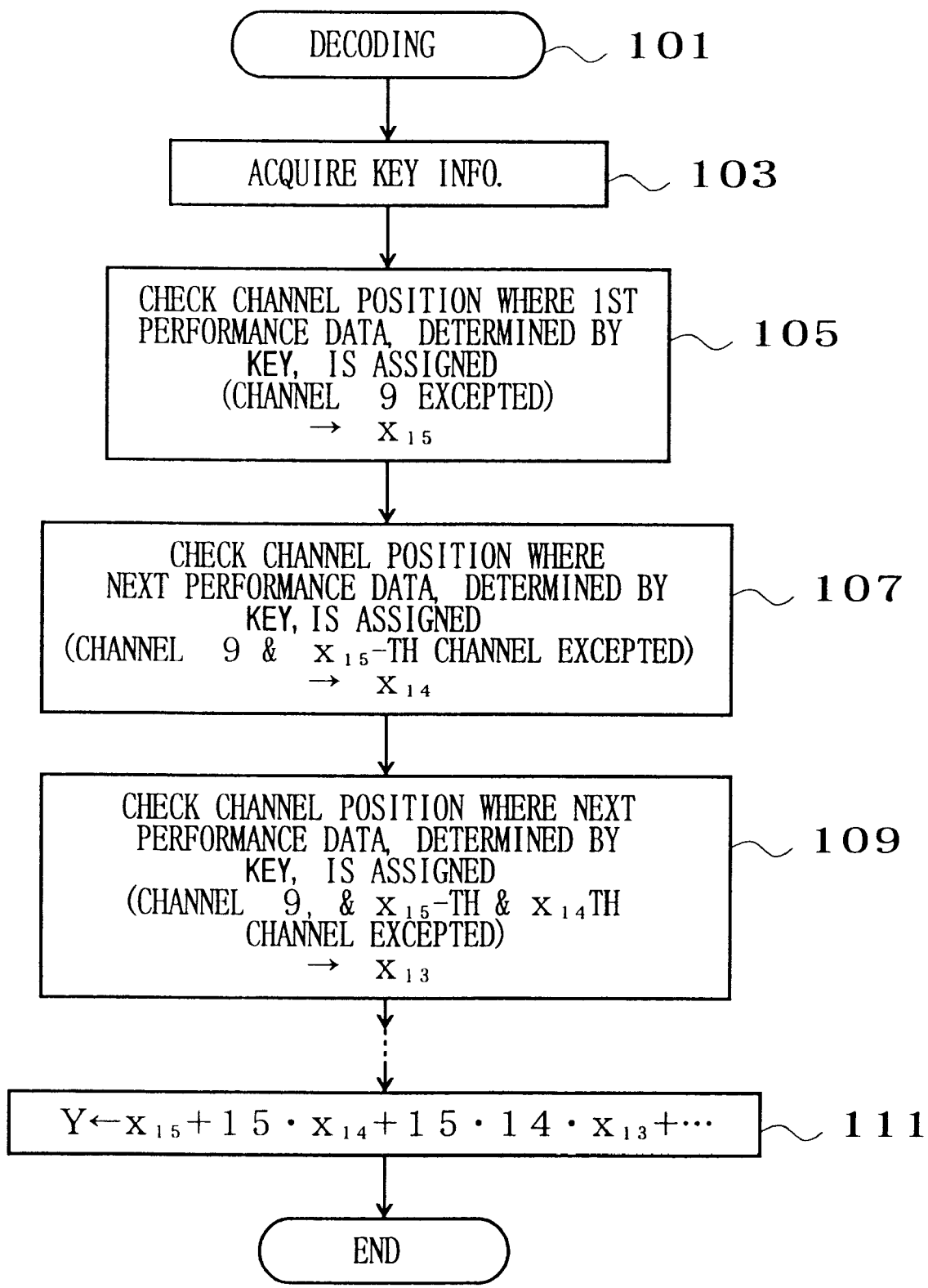
FIG. 5 is a flow chart of a decoding program in accordance with the first embodiment of the present invention.

In FIG. 5, once the user makes a necessary operation for starting up the decoding program, the CPU 11 starts running the decoding program at step 101 and then goes to step 103 in order to acquire the decoding key information KEY. The decoding key information KEY may be acquired in any suitable manner. For example, the user may know the necessary key information KEY through some fair means and enter it via the keyboard or the like. Alternatively, the necessary key information KEY may be prestored in the header portion of the performance data set so that the user can acquire the information KEY by reading it out from the header portion. In another alternative, the necessary key information KEY in the form of electronic watermark information may be embedded at appropriate points in the performance data set constituting the main information so that the user can acquire the key information KEY by decoding it in accordance with a separate decoding program. In still another alternative, the necessary key information KEY may be acquired from an external server via a communication network and communication interface 21. In still another alternative, the necessary key information KEY may be acquired from system exclusive data or meta event data included in the MIDI performance data. Such variations of the way to acquire the decoding key information KEY also apply to all of the other embodiments to be described below.

With the encoding scheme as described above in relation to FIG. 4, the key information KEY to be acquired at this step 103 is the one encoded by applying the encoding algorithms of Mathematical Expression 1 above in the ascending order of tone color numbers. Thus, the original additional information Y hidden within the given performance data set can be decoded by the user knowing the key information KEY and inversely running the encoding algorithms of Mathematical Expression 1 above.

More specifically, the channel positions $x_{15}, x_{14}, x_{13}, \ldots$ are detected in the ascending order of tone color numbers by checking the respective tone color numbers of the individual channels in the given performance data set (steps 105, 107, 109, ... of FIG. 5). As apparent from the foregoing, the channel positions $x_{15}, x_{14}, x_{13}, \ldots$ are not absolute positions but relative positions among the currently-remaining channels available at various stages of the process. For example, where the channel rearrangement was made such that the performance data set having the smallest tone color number, i.e. tone color number 10, is assigned to channel 12, the performance data set having the second tone color number, i.e. tone color number 12, is assigned to channel 5, the performance data set having the third tone color number, i.e. tone color number 15, is assigned to channel 0 and the performance data set having the fourth tone color number, i.e. tone color number 20, is assigned to channel 1 as in the encoding process described above, step 105 of FIG. 5 detects "$x_{15}=11$" on the basis of channel 12 to which the performance data set having the smallest tone color number, i.e. tone color number 10, is currently assigned. At next step 107, channel 5 is detected to which the performance data set having the second tone color number, i.e. tone color number 12, is currently assigned, and then "$x_{14}=5$" is detected on the basis of the fact that thus-detected channel 5 is in the fifth position among the currently-remaining available channels (i.e. channels 0–8, 10, 11 and 13–15 with channels 9 and 12 excepted). Then, at following step 109, channel 0 is detected to which the performance data set having the third tone color number, i.e. tone color number 15, is currently assigned, and then "$x_{13}=0$" is detected on the basis of the fact that thus-detected channel 0 is in the uppermost position of "0" among the currently-remaining available channels (i.e. channels 0–4, 6–8, 10, 11 and 13–15 with channels 9, 12 and 5 excepted). The position of each of the succeeding channels is "0" because each of the succeeding channels is in the uppermost position of "0" among the currently-remaining channels at the various subsequent stages.

Because the channel positions $x_{15}, x_{14}, x_{13}, \ldots$ detected on the basis of the key information KEY in the above-mentioned manner correspond to the remainder values in the encoding algorithms of the various positions in Mathematical Expression 1 above, the value A of the embedded electronic watermark information can be decoded by inversely executing the encoding algorithms, as shown in Mathematical Expression 2 below, using these detected channel positions.

(Mathematical Expression 2)

$$A = x_{15} + (x_{14} \cdot B) + \{x_{13} \cdot B \cdot (B-1)\} + \{x_{12} \cdot B \cdot (B-1) \cdot (B-2)\} + \{x_{11} \cdot B \cdot (B-1) \cdot (B-2) \cdot (B-3)\} + \ldots$$

At step 111 of FIG. 5, the inverse operation according to Mathematical Expression 2 above is carried out to thereby decode the value of the additional information Y embedded as electronic watermark information. In the above-described example where $x_{15}$ is "11", $x_{14}$ is "5" and $x_{13}$ is "0", $Y = 11 + 5 \times 15 + 0 = 86$, from which it may be appreciated that the value "86" of the additional information Y embedded as electronic watermark information is decoded.

Next, modifications of the first embodiment will be described. Whereas the first embodiment has been described as embedding the electronic watermark information by rearranging (or changing the arrangement) the channels in the performance data sets, the arrangement or order of other appropriate data may be changed. Namely, it is desirable that the data to be changed in their arrangement or order be ones a changed arrangement or order of which in the performance data set does not substantially impose adverse influences on music reproduction based on the performance data. Among typical examples of such data are plural kinds of tone generator setting information to be set prior to a start of sounding (i.e., for initial setting purposes), event data of a plurality of chord-constituting notes to be sounded simultaneously, MIDI meta event data (i.e., data having no direct relation to the performance), etc.

Figure 6:
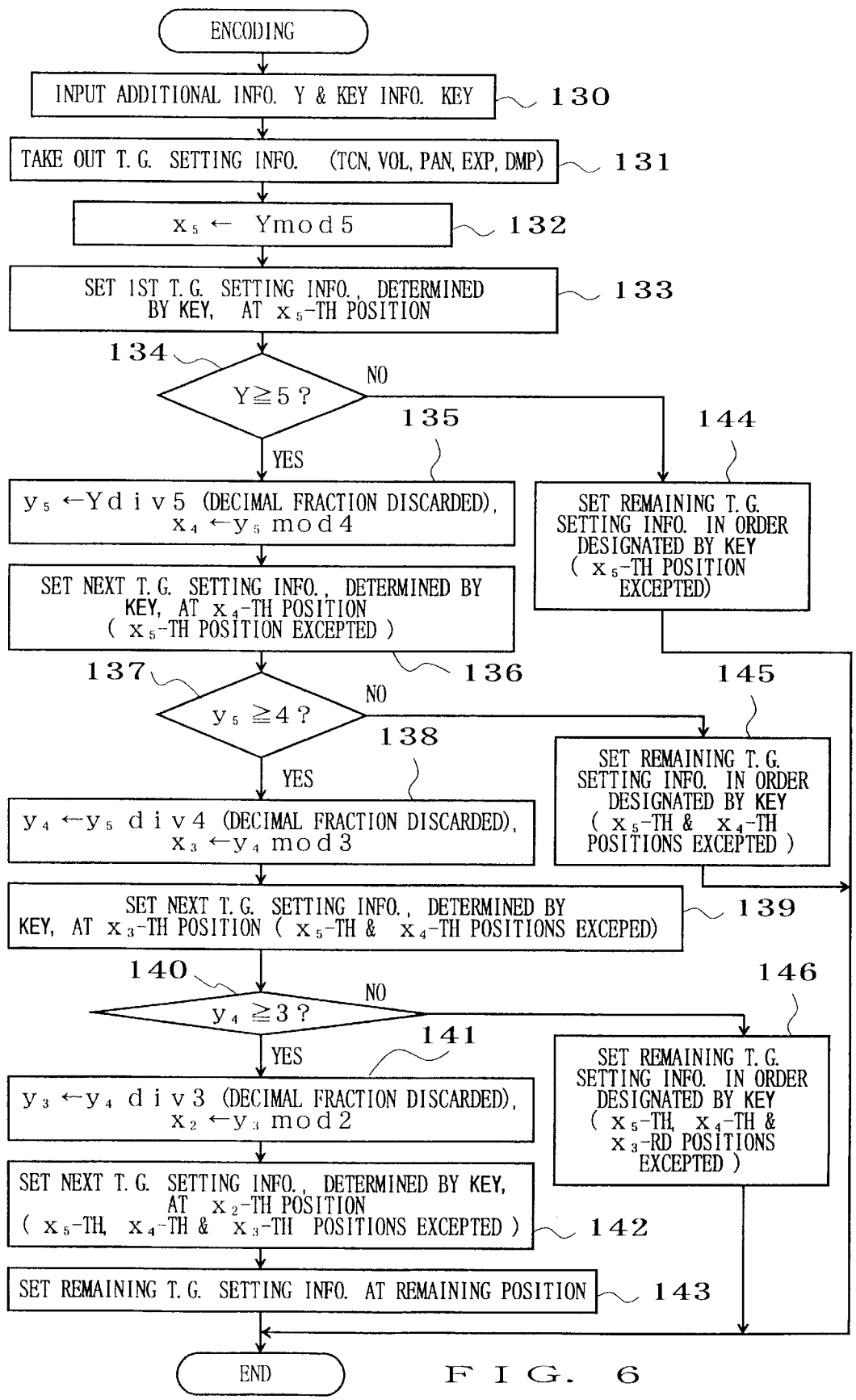
FIG. 6 is a flow chart of another example of the encoding program in accordance with the first embodiment of the present invention.

FIG. 6 is a flow chart showing a modification of the program for embedding (encoding) additional information Y in performance data, where electronic watermark information corresponding to desired additional information is embedded by changing arrangement/order of plural kinds of tone generator setting information in the performance data. In this example, the arrangement/order of five kinds of tone generator setting information, i.e. tone color number data TCN, volume data VOL, panning data PAN, expression data EXP and damping data DMP for initial setting purposes (to be used prior to a start of actual sounding), is changed in accordance with the value of the additional information Y. The key information KEY in this case indicates respective original positions or order of the individual tone generator setting information. The same encoding algorithms as in Mathematical Expression 1 above may be used here. If the arrangement/order of the five kinds of tone generator setting information is to be changed, B is "5" in Mathematical Expression 1 above.

Fundamentally, the encoding process of FIG. 6 is performed in a manner similar to the flow chart of FIG. 4. First, at step 130, the additional information Y and decoding key information KEY is input to the personal computer apparatus similarly to step 102 of FIG. 4. At next step 131, the tone generator setting information to be changed in their arrangement or order is taken out or retrieved from the main information (performance data). At following step 132, the encoding arithmetic operation according to position 0 (Ymod5) in Mathematical Expression 1 above is performed with B=5, to thereby obtain $x_5$ as its solution, i.e. remainder. Then, at step 133, the tone generator setting information at the first position (position 0 in Mathematical Expression 1 above) determined by the input key information KEY is set at the $x_5$-th position in the entire position group. Let's assume here that the 0th position is the uppermost, similarly to the above-mentioned. Assuming that the data TCN, VOL, PAN, EXP and DMP are originally placed in this mentioned order, the tone color number data TCN is set at the $x_5$-th position.

At next step 134, a determination is made as to whether the additional information Y is a value equal to or greater than "5" (=B). With an affirmative answer at step 134, the program proceeds to steps 135 and 136. At step 135, an arithmetic operation is performed according to the encoding algorithm of position 1 in Mathematical Expression 1 above, similarly to steps 110 and 112 of FIG. 4. More specifically, step 135 determines an integral portion of a quotient obtained by dividing the additional information Y by "5" (this integral portion will be represented by $y_5$, and $y_5 = Y \text{div} 5$), and divides the integral portion $y_5$ by 4 ($y_5 \text{mod} 4$) to obtain its solution or remainder $x_4$. Namely, $x_4 = y_5 \text{mod} 4$, which corresponds to the solution of the arithmetic operation of position 1 in Mathematical Expression 1 above when B=5. At following step 136, the tone generator setting information at the second position (position 1) determined by the input key information KEY is set at the $x_4$-th position among the currently-remaining positions with already-determined position $x_5$ excepted. Assuming that the data TCN, VOL, PAN, EXP and DMP are arranged in the above-mentioned original order, the volume data VOL is set at the $x_4$-th position among the currently-remaining positions.

At next step 137, a determination is made as to whether the integral portion $y_5$ of the quotient is equal to or greater than "4". With an affirmative answer at step 137, the program proceeds to steps 138 and 139. At step 138, an arithmetic operation is performed according to the encoding algorithm of position 2 in Mathematical Expression 1 above, similarly to steps 118 and 120 of FIG. 4. More specifically, step 138 determines an integral portion of a quotient obtained by dividing the integral portion $y_5$ by "4" (this integral portion will be represented by $y_4$, and $y_4 = y_5 \text{div} 4$), and then divides the integral portion $y_4$ by 3 to obtain its solution or remainder $x_3$. Namely, $x_3 = y_4 \text{mod} 3$, which corresponds to the solution of the arithmetic operation of position 2 in Mathematical Expression 1 above when B=5. At following step 139, the tone generator setting information of the third position (position 2) determined by the input key information KEY is set at the $x_3$-th position among the currently-remaining positions with already-determined positions $x_5$ and $X_4$ excepted. Assuming that the data TCN, VOL, PAN, EXP and DMP are arranged in the above-mentioned original order, the panning data PAN is set at the $x_3$-th position among the currently-remaining positions.

At next step 140, a determination is made as to whether the integral portion $y_4$ of the quotient is equal to or greater than "3". With an affirmative answer at step 140, the program proceeds to steps 141 and 142, which perform operations, similar to those of steps 138 and 139, with the operated position lowered by one. Thus, "$x_2 = y_3 \text{mod} 2$" is determined, which corresponds to the solution of the arithmetic operation of position 3 in Mathematical Expression 1 above when B=5. Then, the tone generator setting information at the fourth position (original position 3) determined by the input key information KEY is set at the $x_2$-th position among the currently-remaining positions with already-determined positions $x_5$, $X_4$ and $x_3$ excepted. Assuming that the data TCN, VOL, PAN, EXP and DMP are in the above-mentioned original order, the expression data EXP is set at the $x_2$-th position among the currently-remaining positions. Finally, at step 143, because only one position is left, the tone generator setting information at the fifth position (original position 4: damping data DMP in the above-mentioned example) is set at the only one remaining position.

If a negative determination is made at step 134, 137 or 140, the program branches to step 144, 145 or 146 so as to sequentially set the remaining tone generator setting information at the remaining positions in accordance with the key information KEY without carrying out the arithmetic operations of the remaining encoding algorithms (steps 135–143). Of course, even if the arithmetic operations of the remaining encoding algorithms (steps 135–143) are carried out, the positions $x_4$, $x_3$ and $x_2$ will be each determined as position "0" and sequentially set at the positions as designated by the key information KEY. However, jumping to step 144, 145 or 146 can increase the processing speed because it can omit the arithmetic operations of the remaining encoding algorithms.

To promote better understanding, a more specific example of the arrangement/order change of the tone generator setting information in the present invention will be set forth below. Let it be assumed here that the order designated by the key information KEY is just as noted above and the additional information Y to be embedded is a value "86" as also noted above, the tone color number data TCN is set at position 1 (the second position in the entire position group) because of "$x_5$=86mod5=1", the volume data VOL is set at remaining position 1 (the third position in the entire position group) because of "$x_4$=17mod4=1", the panning data PAN is set at remaining position 1 (the fourth position in the entire position group) because of "$x_3$=17mod3=1", the expression data EXP is set at remaining position 1 (the fifth position in the entire position group) because of "$x_2$=1mod2 an=1", and the final damping data DMP is set at remaining position 0 (the first position in the entire position group). Namely, these data are rearranged or replaced in the order of "DMP, TCN, VOL, PAN and EXP".

According to the encoding algorithms based on the arrangement/order change of the tone generator setting information as set forth above, if the number of the tone generator setting information to be subjected to the arrangement/order change is "5", then "5!" different permutational combinations of the tone generator setting information are possible, so that additional information capable of indicating "5!" different values can be embedded, as electronic watermark information, in the performance data (main information). The "5!" different values consist of "log5!" (base is 2) bits, from which it will be understood that even though the arrangement/order of the tone generator setting information to be used for initial setting purposes (prior to a start of actual sounding) is changed in the above-mentioned manner, no adverse influence is brought to a reproductive music performance; thus, embedding the electronic watermark information will, in no way, adversely influence the reproductive performance of the tones and the inventive technique will prove extremely advantageous. The original positions of the individual tone generator setting information designated by the key information KEY of the encoding algorithms used in the arrangement/order change may be determined in any other desired manner than the above-mentioned. In such a case too, the information to be embedded as the additional information Y may be in other form than an ASCII code of a single letter, such as desired letter information representing a plurality of letters, picture information or any other suitable information. For instance, information of 15 letters can be embedded by encoding, for each of 15 tone generator channels 0–8 and 10–15, the arrangement/order of the tone generator setting information to be used for initial setting purposes (prior to the start of actual sounding) in the above-mentioned manner. In addition, the number of pieces of the information to be embedded can be increased by inserting the tone generator setting information at various intermediate (i.e., along-the-way) points in the performance sequence.

Next, a description will be made about an example of the process for decoding the additional information Y embedded in the performance data, with reference to FIG. 7 that is a flow chart showing an example of a program directed to the decoding process. More specifically, FIG. 7 shows a case where the additional information Y is decoded from the performance data which has electronic watermark information, corresponding to the desired additional information Y, embedded by changing the arrangement/order of the tone generator setting information in accordance with the encoding scheme of FIG. 6.

Figure 7:
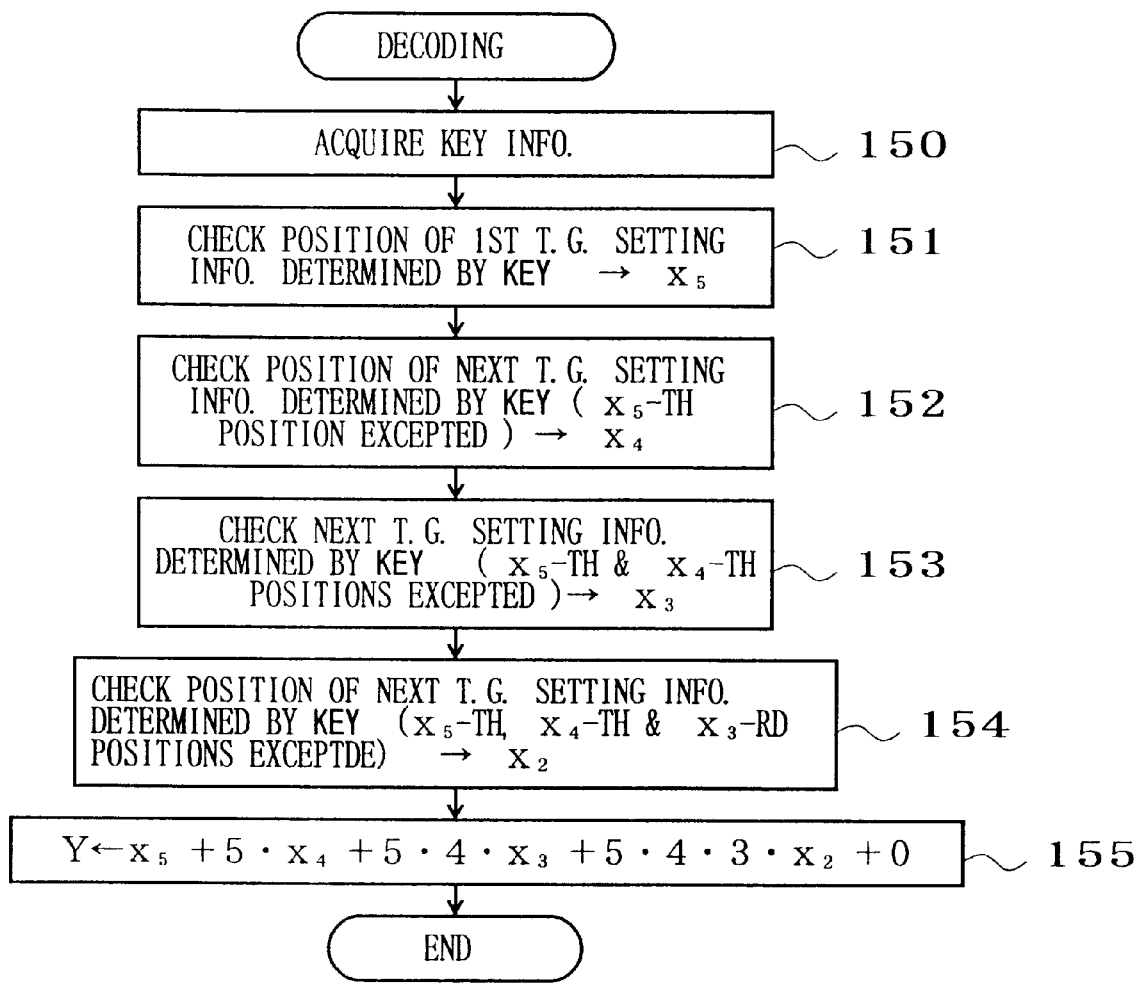
FIG. 7 is a flow chart of another example of the decoding program which corresponds to the encoding program of FIG. 6.

The manner of decoding the additional information Y shown in FIG. 7 is generally the same in principle as that shown in FIG. 5. First, at step 150, the decoding key information KEY is acquired. Then, the channel positions $x_5$, $x_4$, $x_3$, $x_2$, . . . are sequentially detected in the order of the tone generator setting information determined by the key information KEY (steps 151–154). As apparent from the foregoing, the channel positions $x_5$, $x_4$, $x_3$, $x_2$, . . . are not absolute positions but relative positions among the currently-remaining data at various stages of the process. For example, where the data are placed in the order of "DMP, TCN, VOL, PAN and EXP" as in the above-described encoding case, step 151 of FIG. 7 detects the position $x_5$ (=1) of the tone color number data TCN, next 152 of FIG. 7 detects the position $x_4$ (=1) of the volume data VOL, next 153 detects the position $x_3$ (=1) of the panning data PAN, and next 154 detects the position $x_2$ (=1) of the expression data EXP. The last damping data DMP is always at position 0.

Because the positions $x_5$, $x_4$, $x_3$, $x_2$, . . . of the individual tone generator setting information detected on the basis of the key information KEY in the above-mentioned manner correspond to the remainder values in the encoding algorithms of the various positions in Mathematical Expression 1 above, the value of the additional information Y embedded as electronic watermark information can be decoded by just inversely executing the encoding algorithms using the detected positions in a similar manner to Mathematical Expression 2 above. At step 155, such an inverse arithmetic operation is performed as follows:

$$Y = x_5 + (5 \cdot x_4) + (5 \cdot 4 \cdot x_3) + (5 \cdot 4 \cdot 3 \cdot x_2) + 0$$

Because the positions $x_5$, $x_4$, $x_3$ and $x_2$ are all "1", a decoded result of "Y=86" can be obtained.

Figure 8:
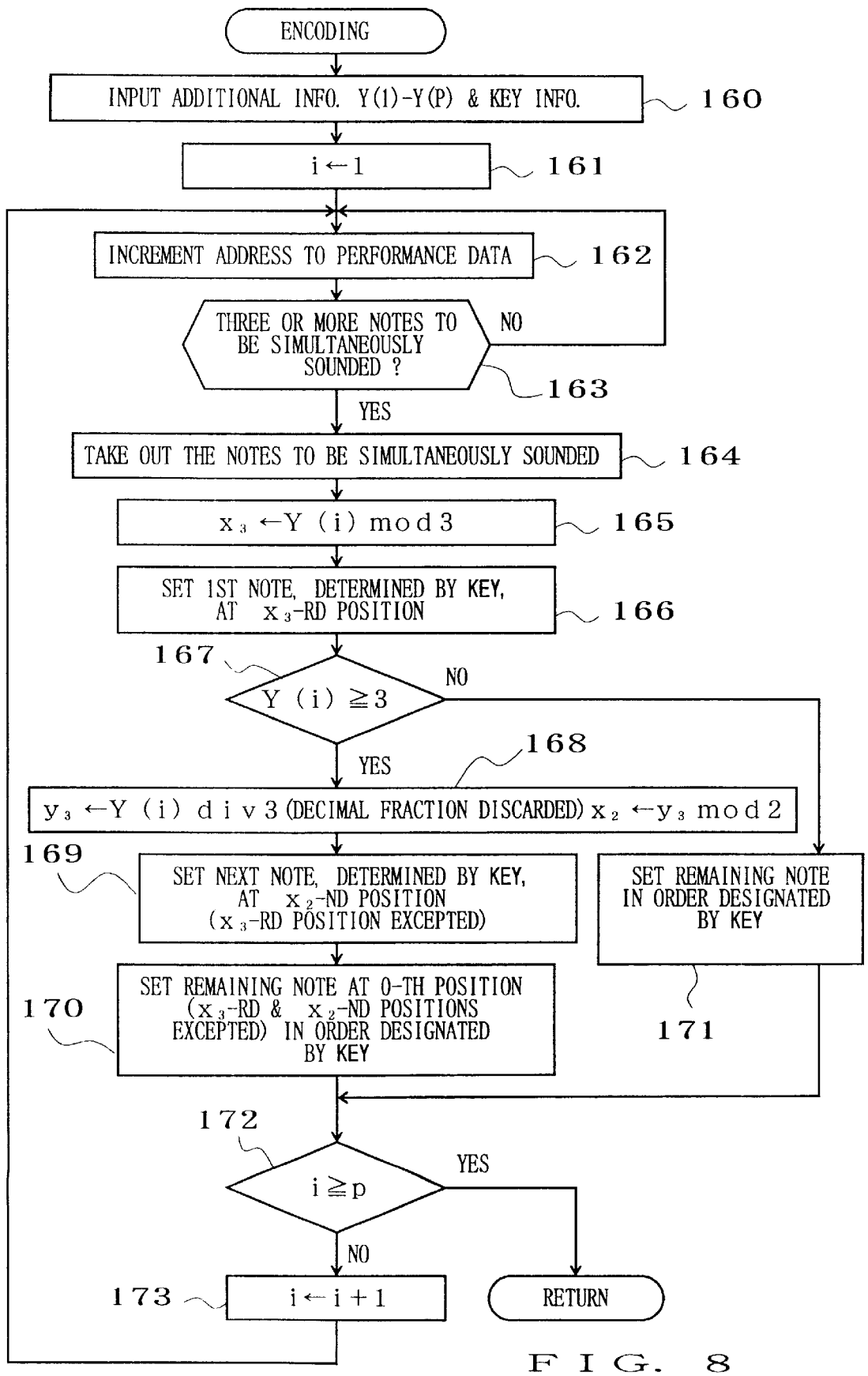
FIG. 8 is a flow chart of still another example of the encoding program in accordance with the first embodiment of the present invention.

FIG. 8 is a flow chart showing another modification of the process for embedding (encoding) additional information Y in performance data, where electronic watermark information corresponding to desired additional information is embedded by changing the arrangement/order of a plurality of chord-constituting notes to be sounded simultaneously. For example, in the case of performance data directed to performing a chord with three simultaneously-sounded notes, the reproductive performance of the chord does not be adversely influenced no matter which one of "3!" different variations or combinations of the note positions is employed, because the chord-constituting notes are sounded simultaneously at any rate. Thus, by setting the arrangement/order of these three simultaneously-sounded notes in accordance with the additional information Y, it is possible to embed, as electronic watermark information, the desired additional information Y having any one of "3!" different values. It should therefore be obvious that if the number of the simultaneously-sounded notes is four, then additional information Y having any one of "4!" different values can be embedded as electronic watermark information. However, for simplicity of explanation, FIG. 8 shows a case where additional information Y having any one of just "3!" different values are embedded, as electronic watermark information, even when the number of simultaneously-sounded notes is four or more. With this modified encoding process, a different item of additional information Y can be embedded, as electronic watermark information, at each chord-performing point in the performance sequence. For convenience of description, a plurality of items of additional information Y that can be embedded will be represented by Y(1), Y(2), Y(3), . . . , Y(p), respectively.

It should be appreciated here that any desired factor may be used as the key information KEY for setting the arrangement/order of the note to be simultaneously sounded. For example, the key information KEY may be an ascending or descending order of note numbers, time lengths till note-off timing, values of velocity data, or the like. The particular factor used as the key information KEY is indicated by the key information KEY. In this modification as well, there may be employed the same encoding algorithms as in Mathematical Expression 1 above. If additional information Y having any one of "3!" different values is embedded as electronic watermark information, B is "3" in Mathematical Expression 1 above.

The manner of encoding the additional information Y shown in FIG. 8 is generally the same in principle as that shown in FIGS. 4 or 6. First, the plurality of items (p items) of additional information Y(1)–Y(p) and the key information KEY to be used for the encoding are input at step 160 to the computer apparatus. At next step 161, an ordinal number i specifying one of the items of additional information Y to be subjected to the encoding process is set to "1". At following step 162, the address pointing to the main information, i.e. performance data, is incremented. At next step 163, it is ascertained whether or not the performance data pointed to by the incremented address represents three or more notes to be simultaneously sounded. With a negative (NO) answer at step 163, the program reverts to step 162 in order to further increment the address to the performance data. Then, once the address has been incremented as far as it points to three or more notes to be simultaneously sounded, an affirmative (YES) answer is made at step 163, so that the performance data corresponding to the three or more notes to be simultaneously sounded are taken out at step 164.

Then, at step 165, the encoding arithmetic operation "Y(i)mod3" according to position 0 in Mathematical Expression 1 above is performed on the i-th additional information Y(i) (Y(1) at the initial stage) so as to obtain its solution or remainder $x_3$. At following step 166, one of the three or more to-be-simultaneously-sounded notes taken out at step 164, which is at the leading position as determined by the key information KEY, is set at the $x_3$-th position in the entire position group.

At following step 167, a determination is made as to whether the additional information Y(i) is a value equal to or greater than "3". If so, an affirmative answer is given at step 167, so that the program proceeds to steps 168–170. At step 168, an arithmetic operation is performed according to the encoding algorithm of position 1 in Mathematical Expression 1 above, similarly to step 135 of FIG. 6. More specifically, step 168 determines an integral portion of a quotient obtained by dividing the additional information Y(i) by "3" (this integral portion will be represented by $y_3$, and $y_3$=Y(i)div3). Then, the integral portion $y_3$ of the quotient is divided by "2" to determine its solution or remainder $X_2$. Namely, $X_2$=$y_3$mod2, which corresponds to a solution to the arithmetic operation of position 1 in Mathematical Expression 1 above when B=3. At next step 169, another one of the three or more to-be-simultaneously-sounded notes, which is at the second position (position 1 in Mathematical Expression 1 above) as determined by the key information KEY, is set at the $x_2$-th position among the currently-remaining positions with already-determined position $x_3$ excepted. Further, at step 170, others of the three or more to-be-simultaneously-sounded notes, which are at and after the third position as determined by the key information KEY, are set at the respective positions, as determined by the key information KEY, from among the currently-remaining positions with already-determined positions $x_3$ and $x_2$ excepted; namely, the note at the third position (position 2 in Mathematical Expression 1 above) is set at the 0th position among the currently-remaining positions with already-determined positions $x_3$ and $x_2$ excepted. If there is still another note at or after the fourth position, such a note is set at a still lower position. In case the additional information Y(i) is a value smaller than "3", a negative determination is made at step 167, so that the program branches to step 171 so as to sequentially set the remaining notes at the remaining positions as determined by the key information KEY without carrying out the remaining encoding arithmetic operations (steps 168–170).

At following step 172, a determination is made as to whether or not the ordinal number i has become equal to or greater than the maximum value "p". If not, a negative answer is given at step 172, so that the program reverts to step 162 after incrementing the ordinal number i by one. This way, the operations of steps 162–172 are repeated for each additional information Y(i) to be embedded next. Then, once the ordinal number i has reached the maximum value p (i=p) and all the items of the additional information Y(i) have been embedded, an affirmative determination is made at step 172, so that this encoding process is terminated here.

To promote better understanding, a more specific example of the arrangement/order change of the three or more notes to be simultaneously sounded will be set forth below. Let it be assumed here that the notes to be simultaneously sounded are C3, E3 and G3, the key information KEY specifies an ascending order of note numbers and the additional information Y(1) to be embedded is a value "5", in which case note C3 at the leading or first position is set at position 2 (the third position in the entire note group) because of "$x_3$=5mod3=2" at step 165 (step 166), note E3 at the next position is set at position 1 (the second position among the currently-remaining notes and also the second position in the entire note group) because of "$x_2$=1mod2=1" at step 168 (step 169), and note G3 at the last position is set at position 0 (the first position among the currently-remaining notes and also the first position in the entire note group) (step 170). In this case, the additional information Y(1) capable of being embedded in the main information can take any one of "3!" different values.

Figure 9:
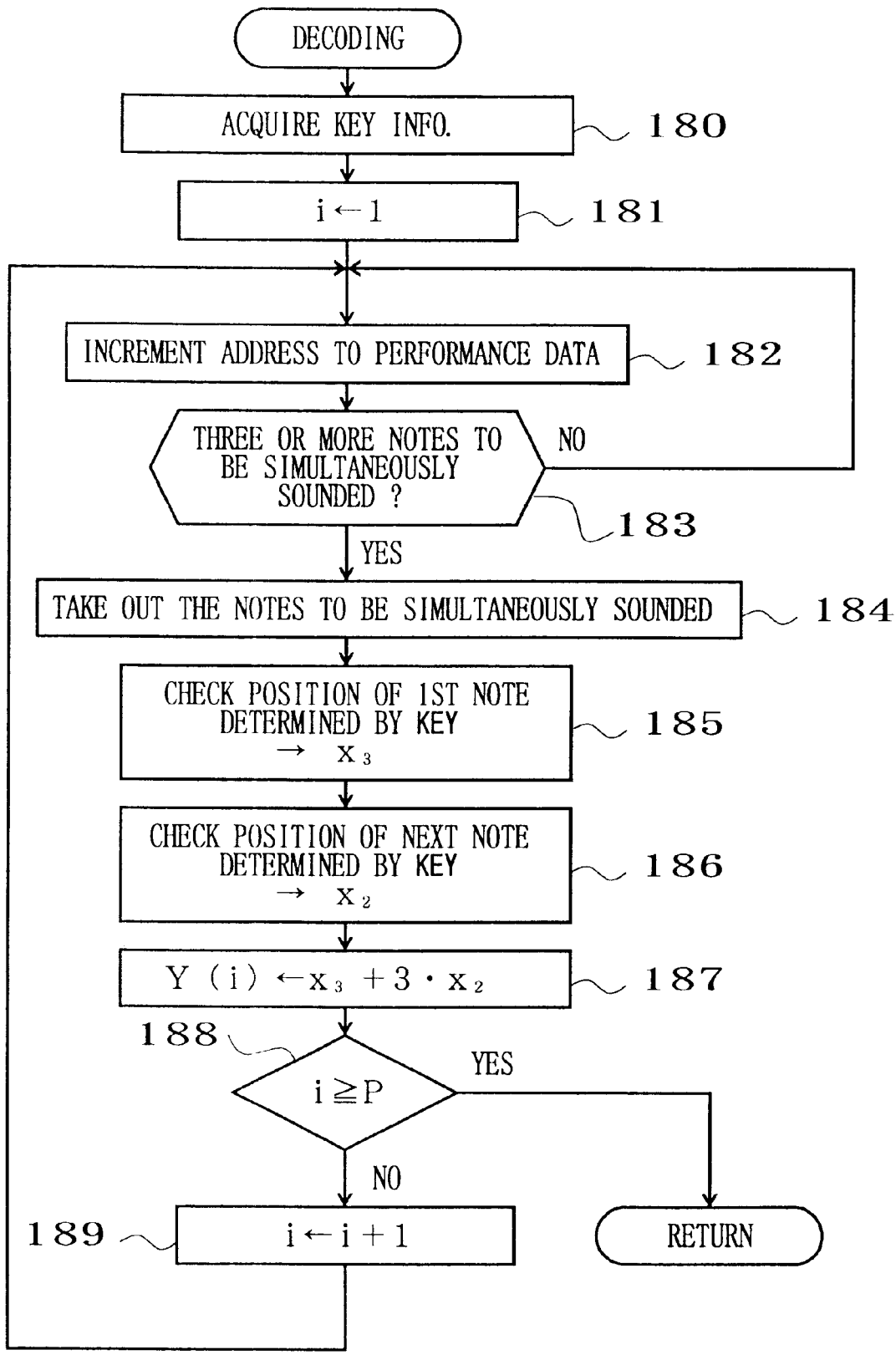
FIG. 9 is a flow chart of still another example of the decoding program which corresponds to the encoding program of FIG. 8.

The following paragraphs describe an exemplary manner in which each of the items of additional information Y(1)–Y(p) is decoded from the performance data having embedded therein the watermark information corresponding to the desired additional information in accordance with the encoding scheme of FIG. 9.

The manner of decoding the additional information shown in FIG. 9 is generally the same in principle as that shown in FIGS. 5 or 7 and comprises inversely executing the encoding algorithm of FIG. 8. First, the decoding key information KEY is acquired, and the ordinal number i is set to an initial value of 1, at steps 180 and 181. Then, at following steps 182, 183 and 184, the performance data corresponding to the three or more notes to be simultaneously sounded are taken out by carrying out operations similar to those of steps 162, 163 and 164. Then, the note positions $x_3$ and $x_2$ are sequentially detected in the order of the notes determined by the key information KEY (steps 185 and 186). As also apparent from the foregoing, the note positions $x_3$ and $x_2$ are not absolute positions but relative positions among the currently-remaining data at various stages of the process. Then, at step 187, the value of the additional information Y(i) embedded as electronic watermark information is decoded by inversely executing the encoding algorithm using the detected positions similarly to Mathematical Expression 2 above. Namely, $$Y(i)=x_3+(3 \cdot x_2)+0$$

In the above-described encoding case, note C3 at the first position is set at position 2, so that "$x_3=2$" is detected, and because note E3 at the second position is set at position 2, "$x_2=1$" is detected. Thus, a decoded result of Y(i)=5 can be obtained from $$Y(i)=2+(3 \cdot 1)=5$$

Steps 188 and 189 are similar to steps 172 and 173 of FIG. 8, and the operations of steps 182–187 are repeated until decoding of all the items of the additional information Y(1)–Y(p) is completed.

In addition to the above-mentioned, watermark information corresponding to any desired additional information can also be embedded by rearranging or changing positions of particular data within the main information which will not impose adverse influences on the reproductive performance. Among examples of such data that will not impose adverse influences on the reproductive performance is MIDI meta event data. In MIDI performance data, copyright information is often recorded as meta event data, in which case plural kinds of data, such as data of letter "C" representing that the data in question is a copyright indication and data indicative of a year of completion of the work or music piece and author of the work, are recorded as separate meta event data in the MIDI performance data in appropriate order. The arrangement/order of the plural kinds of data can be embedded as watermark information by rearranging the data in accordance with the value of the desired additional information Y and appropriate key information KEY. In principle, the same encoding algorithm as shown in FIG. 8 can be used for that purpose.

Figure 10:
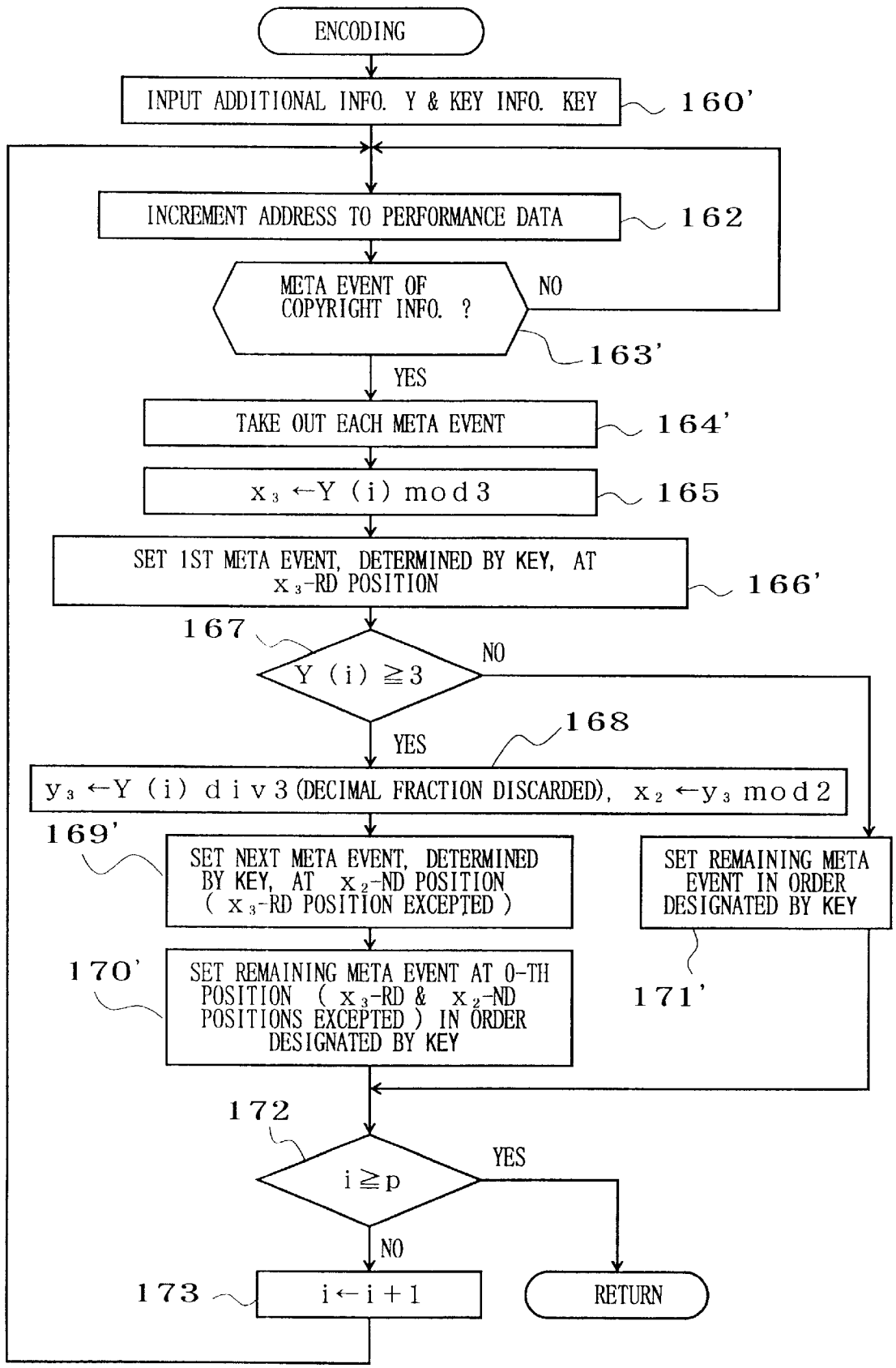
FIG. 10 is a flow chart of yet another example of the encoding program in accordance with the first embodiment of the present invention.

FIG. 10 is a flow chart showing an example of an encoding algorithm for changing the arrangement/order of meta events constituting copyright information. In FIG. 10, steps directed to substantially the same operations as those of FIG. 8 are denoted by the same reference numerals and will not be described here to avoid unnecessary duplication. The flow chart of FIG. 10 is different from that of FIG. 8 in that step 160' replaces step 160 of FIG. 8 and only one item of additional information Y is input and embedded; thus, steps 161, 172 and 173 of FIG. 8 are omitted in FIG. 10. At step 163', a determination is made as to whether or not the read-out performance data represents a meta event of the copyright information. If answered in the affirmative at step 163', various meta event data pertaining to the copyright information are retrieved at step 164'. For example, step 164' retrieves the above-mentioned three kinds of data, i.e. data indicative of the letter "C", data indicative of date of completion of the work and data indicative of the author of the work. Let's assume here that the key information KEY designates a predetermined order of the three data that is the same as just mentioned above. At step 166', position $x_3$ is set for the first meta event data (i.e., the letter "C" data). At step 169', position $x_2$ out of the currently-remaining positions is set for the second meta event data (i.e., the completion date data). At step 170', position 0 out of the currently-remaining positions is set for the third meta event data (i.e., the author data).

Assuming that the additional information Y to be embedded is a value "5", as in the above-mentioned encoding case, the first meta event data (letter "C" data) is set at position 2 (the third position in the entire data group) because of "$x_3=5 \bmod 3=2$" at step 165, the second meta event data (completion date data) is set at position 1 (the second position among the currently-remaining data and also the second position in the entire data group) because of "$x_2=1 \bmod 2=1$" at step 168, and the last meta event data (author data) is set at position 0 (the first position among the currently-remaining data and also the first position in the entire data group) (step 170'). In this case too, the additional information Y capable of being embedded can take any one of "3!" different values.

The process for decoding the additional information Y from the performance data having embedded therein the watermark information corresponding to the desired additional information Y in accordance with the encoding scheme of FIG. 10 may be done by inversely executing the encoding algorithm of FIG. 10, basically in a similar manner to the decoding process of FIG. 9. Detailed description about this recording process is omitted here because it is just similar to the description made above in relation to FIG. 9.

Among further examples of the data in the main information, which can be changed in their arrangement/order for the purpose of embedding watermark information corresponding to desired additional information without involving adverse influences on the reproductive performance, is "control data" or MIDI "program change" data that, even when a given setting thereof is changed in the course of generation of a tone, will not substantially influence the tone being generated. For example, if an instruction for changing a tone color setting with the "control data" or MIDI "program change" data is issued at certain timing during generation of a tone, the tone color setting of the tone being currently generated is not be changed, but the tone color will be changed beginning with a tone to be generated next. Thus, the influences on the reproductive performance does not differ whether the "control data" or MIDI "program change" data is inserted in the performance sequence at timing during generation of a given first tone or at timing between the end of the generation of the first tone and the start of generation of a next or second tone. Therefore, one-bit additional information Y can be embedded without influencing the reproductive performance by inserting a change event of the "control data" or MIDI "program change" data at the timing during generation of a given first tone or at the timing between the end of the generation of the first tone and the start of generation of the next or second tone. The decoding can be appropriately dealt with by such a scheme in accordance with which it outputs a value "0" when the change event of the "control data" or MIDI "program change" data is inserted at the timing during generation of a given first tone but outputs a value "1" when the change event of the "control data" or MIDI "program change" data is inserted at the timing between the end of the generation of the first tone and the start of generation of the next or second tone.

[Second Embodiment]

Now, a second preferred embodiment of the present invention will be described. The second preferred embodiment is characterized primarily by embedding electronic watermarks of desired additional information Y by manipulating or controlling values of performance data and in particular by a combination of changed states of time information pertaining to a plurality of performance data. More specifically, the second preferred embodiment is designed to embed electronic watermarks of desired additional information Y in the form of a combination of changed states of time information pertaining to a plurality of kinds of tone generator (T.G.) setting information.

Example of an encoding algorithm employed in the second preferred embodiment will be described below.

Let's assume here that the plurality of kinds of tone generator setting information are five different data: tone color number data TCN (corresponding to a program change in the MIDI data format); volume data VOL; panning data PAN; expression data EXP; and damping data DMP. Note that these items of tone generator setting information may include data inserted in the performance sequence without being limited those that are to be used for initial setting purposes (prior to a start of actual sounding), and let it also be assumed that these items of tone generator setting information are accompanied by time information (interval data $\Delta T$) each indicative of a time interval between adjoining events.

First, order of the plural kinds of tone generator setting information is set in accordance with first key information KEY1; the following description will be made on the assumption that the tone generator setting information has been arranged in the order of "TCN, VOL, PAN, EXP and DMP".

Then, resolution n of a change-amount or difference value $\Delta d$, which is to be used for changing the time information (interval data $\Delta T$), is set in accordance with second key information KEY2. It should be very advantageous to set the resolution n to 3 (n=3) and the difference value $\Delta d$ to be able to take any one of three values "+1", "0" and "−1", in order to limit a change amount of the time information to a minute value; thus, the following description will be made in relation to these settings of the resolution n and difference value $\Delta d$.

Then, a function "f(m) (=n')" is defined for the time information (interval data $\Delta T$) using third key information KEY3. Here, m represents a value of the time information (interval data $\Delta T$) and $0 \leq n' \leq n$. The following description is also based on the assumption that f(m) equals "m mod n". Namely, f(m) represents a remainder of a quotient obtained by dividing the value m of the time information (interval data $\Delta T$) by the value n of the second key information KEY2.

After that, arithmetic operations to determine target changed remainder values $d_1$, $d_2$, $d_3$, $d_4$ and $d_5$ of the respective time information (interval data $\Delta T$) of the individual tone generator setting information are performed, in the order set by the first key information KEY1, in accordance with the value of the additional information Y to be embedded and also in accordance with encoding algorithms in Mathematical Expression 3 below.

(Mathematical Expression 3)

Position 0 (TCN): Ymod n=$d_1$
Position 1 (VOL): (Ydiv n) mod n=$d_2$
Position 2 (PAN): ((Ydiv n) div n) mod n=$d_3$
Position 3 (EXP): (((Ydiv n) div n) div n) mod n=$d_4$
Position 4 (DMP): ((((Ydiv n) div n) div n) div n) mod n=$d_5$ The operators in this Mathematical Expression 3 have the same meanings as those already described above; the operator "mod" means determining, as a solution, the remainder left over in the division result or quotient and the operator "div" means determining, as a solution, of the integral portion of the division result or quotient. For instance, "Ymod n" represents the remainder of the quotient obtained by dividing the additional information value Y by the value n (preferably n=3) set by the second key information KEY2. Further, "(Ydiv n) mod n" represents the remainder of the quotient obtained by dividing the integral portion of the quotient (Ydiv n), evaluated by dividing the additional information value Y by the value n, by the value n. Furthermore, "((Ydiv n) div n) mod n" represents the remainder of the quotient obtained by first dividing the integral portion of the quotient (Ydiv n), evaluated by dividing the additional information value Y by the value n, by the value n and further dividing the integral portion of the quotient ((Ydiv n) div n) of by the value n.

If n=3 in Mathematical Expression 3 above, each of the target changed remainder values $d_1$, $d_2$, $d_3$, $d_4$ and $d_5$ takes any one of "0", "1" and "2".

For purposes of further description, the values of the original time information (interval data $\Delta T$) of the above-mentioned data TCN, VOL, PAN, EXP and DMP are represented by $m_1$, $m_2$, $m_3$, $m_4$ and $m_5$, respectively. In order to cause the remainders, left over in division of the individual values $m_1$, $m_2$, $m_3$, $m_4$ and $m_5$ by the value n (=3), to equal the target changed remainder values $d_1$, $d_2$, $d_3$, $d_4$ and $d_5$, it is only necessary that the difference values $\Delta d_1$, $\Delta d_2$, $\Delta d_3$, $\Delta d_4$ and $\Delta d_5$, which are all set to "0", be added to the original values $m_1$, $m_2$, $m_3$, $m_4$ and $m_5$ when the target changed values $d_1$, $d_2$, $d_3$, $d_4$ and $d_5$ are all "0", the difference values $\Delta d_1$, $\Delta d_2$, $\Delta d_3$, $\Delta d_4$ and $\Delta d_5$, which are all set to "+1", be added to the original values $m_1$, $m_2$, $m_3$, $m_4$ and $m_5$ when the target changed values $d_1$, $d_2$, $d_3$, $d_4$ and $d_5$ are all "1", and the difference values $\Delta d_1$, $\Delta d_2$, $\Delta d_3$, $\Delta d_4$ and $\Delta d_5$, which are all set to "−1", be added to the original values $m_1$, $m_2$, $m_3$, $m_4$ and $m_5$ when the target changed values $d_1$, $d_2$, $d_3$, $d_4$ and $d_5$ are all "2".

More specifically, if the changed value of the time information (interval data $\Delta T$) of the data TCN, VOL, PAN, EXP and DMP are represented by $m_1'$, $m_2'$, $m_3'$, $m_4'$, and $m_5'$, respectively, these changed values $m_1'$, $m_2'$, $m_3'$, $m_4'$, and $m_5'$, can be determined through arithmetic operations according to Mathematical Expression 4 below.

(Mathematical Expression 4)

TCN: $m_1'=m_1+\Delta d_1$

VOL: $m_2'=m_2+\Delta d_2$

PAN: $m_3'=m_3+\Delta d_3$

EXP: $m_4'=m_4+\Delta d_4$

DMP: $m_5'=m_5+\Delta d_5$

Figure 11:
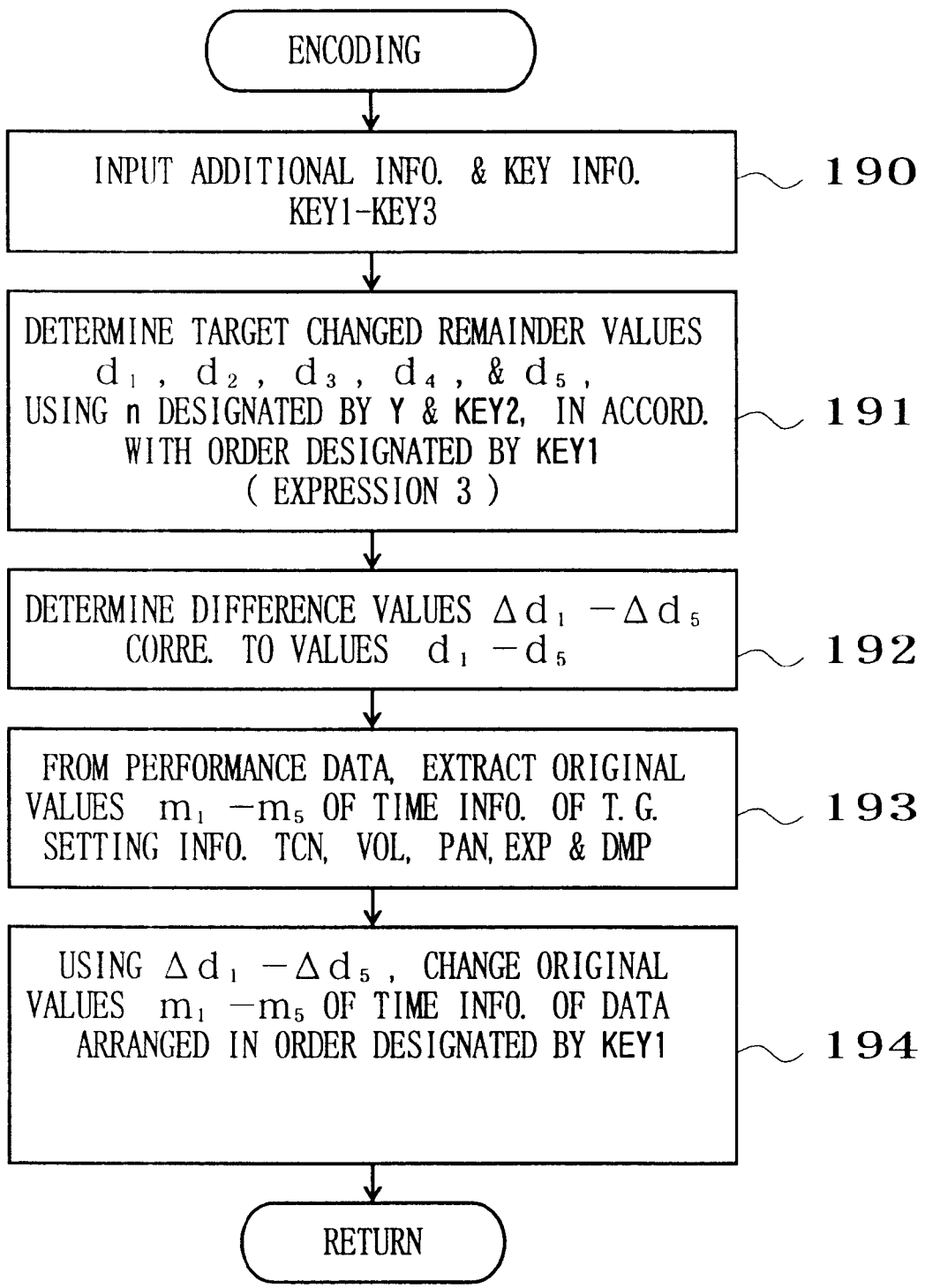
FIG. 11 is a flow chart of an encoding program in accordance with the second embodiment of the present invention.

In order to implement the encoding process as noted above, it is only necessary that the program be built as appropriate. FIG. 11 shows an example of the program capable of implementing the encoding process as set forth above. At first step 190, the additional information Y to be embedded and the first to third key information KEY1, KEY2 and KEY3 is input to the inventive computer apparatus. At next step 191, the arithmetic operations based on the encoding algorithms of Mathematical Expression 3 above, which are intended to determine respective target changed remainder values $d_1$, $d_2$, $d_3$, $d_4$ and $d_5$ of the time information (interval data ΔT) of the individual tone generator setting information, are performed, in the order set by the first key information KEY1, using the value n specified by the second key information KEY2 and also in accordance with the value of the additional information Y to be embedded. At following step 192, the difference values $\Delta d_1$, $\Delta d_2$, $\Delta d_3$, $\Delta d_4$ and $\Delta d_5$ are obtained from the thus-determined target changed remainder values $d_1$, $d_2$, $d_3$, $d_4$ and $d_5$, respectively. Namely, as noted earlier, the difference values $\Delta d_1$, $\Delta d_2$, $\Delta d_3$, $\Delta d_4$ and $\Delta d_5$ are all "0" when the target changed remainder values $d_1$–$d_5$ are "0", are all "+1" when the target changed remainder values $d_1$–$d_5$ are "1", and are all "−1" when the target changed remainder values $d_1$–$d_5$ are "2". Then, at step 193, the original values $m_1$, $m_2$, $m_3$, $m_4$ and $m_5$ of the time information (interval data ΔT) of the individual data TCN, VOL, PAN, EXP and DMP are taken out from the head (or a predetermined range) of the performance data at step 193. At following step 194, the difference values $\Delta d_1$–$\Delta d_5$ are all added to the original values $m_1$–$m_5$, respectively, of the time information (interval data ΔT) of the individual data TCN, VOL, PAN, EXP and DMP in accordance with Mathematical Expression 4 above, so as to determine the changed values $m_1'$–$m_5'$ of the time information (interval data ΔT) of the data TCN, VOL, PAN, EXP and DMP. Then, the time information (interval data ΔT) of the individual data TCN, VOL, PAN, EXP and DMP taken out at preceding step 193 is replaced by the corresponding changed values $m_1'$–$m_5'$.

Figure 12:
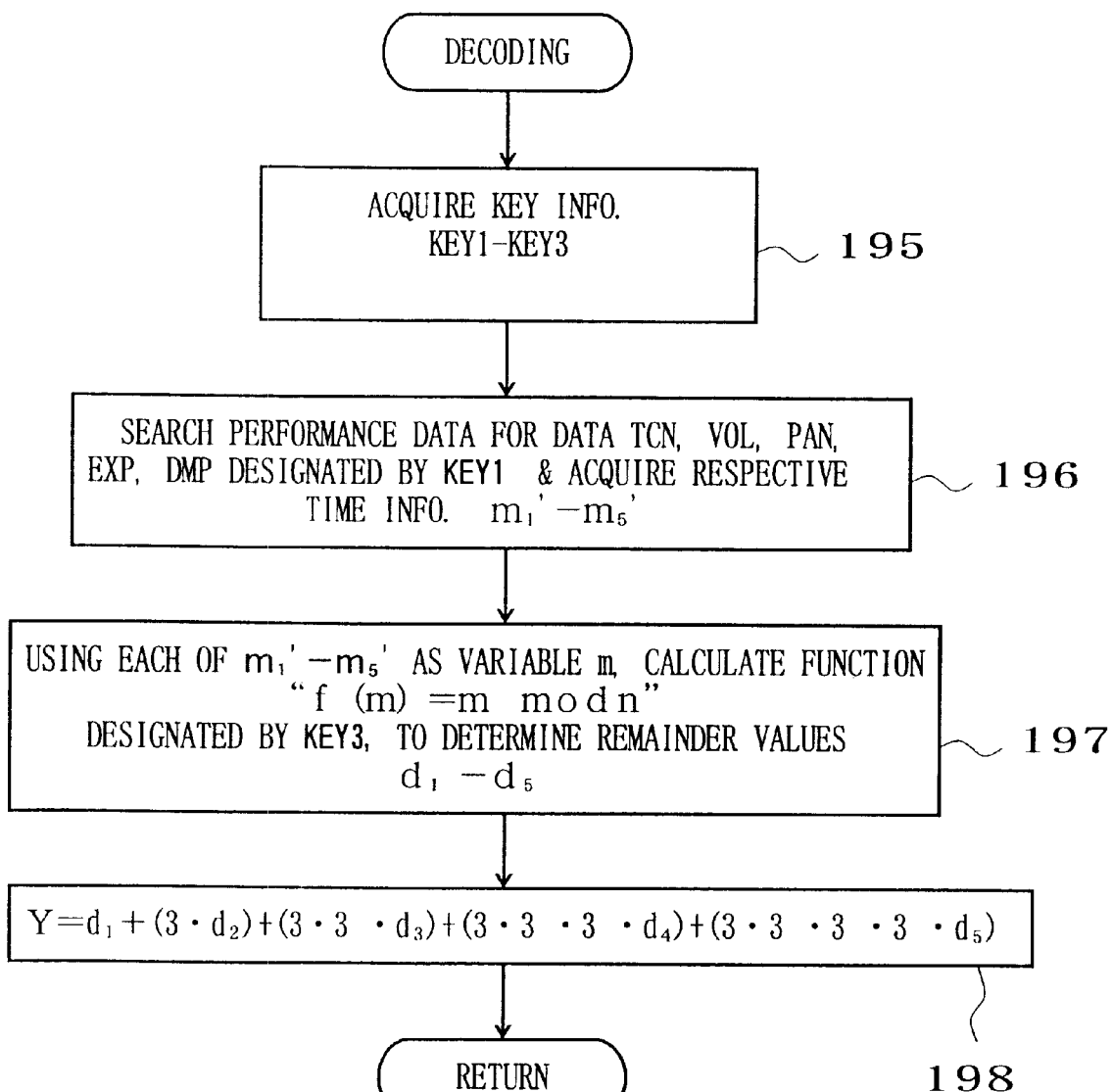
FIG. 12 is a flow chart of a decoding program in accordance with the second embodiment of the present invention.

The following paragraphs describe an exemplary manner in which the additional information Y is decoded from the performance data having embedded therein the watermark information corresponding to the desired additional information in accordance with the encoding scheme of FIG. 11, with reference to FIG. 12 showing an example of a program directed to the decoding process. The manner of decoding the additional information shown in FIG. 12 is generally the same in principle as the above-mentioned decoding processes and comprises inversely executing the encoding algorithm of FIG. 11. First, the decoding key information KEY1, KEY2 and KEY3 is acquired at step 195. Then, at step 196, the changed values $m_1'$, $m_2'$, $m_3'$, $m_4'$, and $m_5'$ of the time information (interval data ΔT) of the individual data TCN, VOL, PAN, EXP and DMP, arranged in the order specified by the first key information KEY1, are taken out from the head (or predetermined range) of the performance data. At step 197, the function "f(m)=m mod n" specified by the third key information KEY3 is calculated by applying each of the taken-out values $m_1'$–$m_5'$ as the variable m and using the value n specified by the second key information KEY2, so as to determine the respective remainder values $d_1$–$d_5$. At next step 198, the encoding algorithms of Mathematical Expression 3 are carried out inversely to thereby decode the value of the additional information Y in a manner as shown in Mathematical Expression 5 below.

(Mathematical Expression 5)

$$Y = d_1 + (n \cdot d_2) + (n \cdot n \cdot d_3) + (n \cdot n \cdot n \cdot d_4) + (n \cdot n \cdot n \cdot n \cdot d_5)$$

Here, as a more specific example, the target changed remainder values $d_1$–$d_5$ according to Mathematical Expression 3 when Y=86 and n=3 and the difference values $\Delta d_1$–$\Delta d_5$ may be expressed as follows:

TCN: $d_1$=86 mod 3=2, $\Delta d_1$=−1

VOL: $d_2$=28 mod 3=1, $\Delta d_2$=+1

PAN: $d_3$=9 mod 3=0, $\Delta d_3$=0

EXP: $d_4$=3 mod 3=0, $\Delta d_4$=0

DMP: $d_5$=1 mod 3=1, $\Delta d_5$=+1

Further, according to this example of decoding scheme, the remainder values $d_1$–$d_5$ are determined, through the arithmetic operations based on the function "f(m)=m mod n", in such a manner that $d_1$=2, $d_2$=1, $d_3$=0, $d_4$=0 and $d_5$=1. Therefore, the decoding arithmetic operation of Mathematical Equation 5 becomes $$Y = 2 + (3 \cdot 1) + 0 + 0 + (3 \cdot 3 \cdot 3 \cdot 1) = 86$$

Thus, the additional information Y can be decoded as the value "86".

In the above-described manner, the electronic watermark of the desired additional information Y can be embedded in the form of changed states of the time information of the plural kinds of the tone generator setting information. More specifically, this inventive scheme is characterized by changing the time information of the plural kinds of the tone generator setting information (TCN, VOL, PAN, EXP and DMP) in the main information in accordance with the value of the additional information Y and then embedding the electronic watermark of the desired additional information Y in the form of the changed states of the time information of the plural tone generator setting information. Because the additional information Y is encoded in a very complicated form like this, the inventive encoding scheme can effectively prevent any unauthorized dishonest person from altering or tampering with the additional information. Further, a not-so-great change in the time information of the tone generator setting information does not substantially influence the reproductive music performance, as distinct from a slight change in the time information pertaining to the tone generation instructions such as a note-on event. Further, the time change amount in the described embodiment is any one of "+1", "0" and "−1", which is a very slight change that is hardly appreciable by human listeners. Furthermore, because the time information of the tone generator setting information is usually not changed frequently even during editing of the performance data by an authorized user, there is very little chance of the additional information being altered unintentionally or unconsciously by the authorized user. In this case too, the information to be embedded as the additional information Y may be in other form than an ASCII code of a single letter, such as desired letter information representing a plurality of letters, pictorial information or any other suitable information. For instance, information of 15 different letters can be embedded by encoding, for each of the 15 tone generator channels 0–8 and 10–15, the arrangement/order of the tone generator setting information in accordance with the above-described procedures. In addition, the number of the information to be embedded can be increased by inserting the tone generator setting information at various intermediate (along-the-way) points in the performance sequence. Furthermore, the manner of interlinking the additional information embedded across the channels may be decided as desired, and key information indicative of the manner of interlinking the additional information embedded across the channels may be supplied whenever necessary. For instance, the embedded additional information may be interlinked in accordance with the order of the channel numbers, tone color numbers allocated to the individual channels, averages of note numbers of the performance data in the individual channels, and the key information may indicate which kind of interlinking approach should be employed.

In one modification of the second embodiment, the time information of any other performance data than plural kinds of tone generator setting information may be changed for the purpose of embedding additional information. For example, the additional information encoding may be performed such that the time information of plural pieces of tone control information of a same kind (e.g., MIDI control change data) changes subtly through procedures similar to the above-mentioned. For this purpose, the first key information KEY1, for example, may designate a specific order of five control change data of a same kind that are to be sequentially processed in accordance with a predetermined performance sequence. Then, the respective time information (interval data ΔT) of these control change data can be subjected to an encoding process based on algorithms similar to those in Mathematical Expression 3 and Mathematical Expression 4 having been shown and described in relation to the second embodiment. In this case, the first key information KEY1 may designate a specific order of five control change data pertaining to two or more desired kinds, rather than just one and the same kind, of tone control information, that are to be sequentially processed in accordance with the performance sequence, and then the encoding process may be performed on these control change data in a manner as described above. Also note that whereas the second embodiment has been described above with the tone generator setting information (e.g., program change data) clearly distinguished from the tone control information (e.g., control change data), it is not necessary to make such a particular distinction between the tone generator setting information and the tone control information, because both the tone generator setting information and the tone control information is information that is used for setting/control of tones.

As a further modification of the second embodiment, desired additional information can be embedded as in the above-described embodiment, for example, by changing information indicative of a time from note-on event timing to note-off event timing (so-called "duration time") in accordance with algorithms similar to those employed in the above-described embodiment. Note-so-great change in the duration time, e.g. in the order of +1 or −1, is hardly perceivable, and therefore such a data change is permissible to a certain degree. In that case, the first key information KEY1 may designate an occurrence order of a predetermined number of note-on events (e.g., five note-on events) from the beginning of the performance data. Namely, the five note-on events may be subjected to the encoding arithmetic operations according to Mathematical Expression 3 with positions 0–4 imparted to the note-on events, respectively, and then the original duration times $m_1$–$m_5$ of tones corresponding to the five note-on events may be changed according to Mathematical Expression 4 and in accordance with the target changed remainder values $d_1$–$d_5$ determined through the arithmetic operations of Mathematical Expression 3. Because a multiplicity of tone generating events are contained in the performance data, this modification can significantly increase the quantity of the additional information that can be embedded in the performance data. Note that in the case where the duration time data are contained directly in the performance data, the duration time data themselves may be changed. If, on the other hand, the duration time data are not contained directly in the performance data, then the timing of each note-off event may be changed because such a change in the note-off event timing can also change the duration time from the immediately-preceding note-on event to that note-off event.

[Third Embodiment]

Next, a third preferred embodiment of the present invention will be described. The third preferred embodiment is characterized by embedding electronic watermarks of desired additional information Y by manipulating or controlling values of performance data similarly to the above-described second embodiment. For example, the third embodiment to be described below is designed to embed electronic watermarks of desired additional information Y by controlling use/non-use of special status data, such as data indicative of MIDI running statuses.

In a typical case, each MIDI message is composed of a status byte and a data byte, and the status byte includes status information indicative of a status of the event in question. It is known that the running status is among the various MIDI statuses. When the status of a given event in the performance sequence is just duplication of the immediately-preceding event status, the MIDI running status indicates that the current status is the same as the immediately-preceding status by omitting status information corresponding to the current status. Not using such a running status of course does not impose any influences on execution of the music performance. Namely, the execution of the reproductive music performance will not be substantially influenced even if the running status is not used in a region where it is usable and status information indicative of the same status as the immediately-preceding event status is imparted to the current event. Thus, according to the third embodiment, one-bit electronic watermark information can be embedded without the execution of the music performance being adversely influenced by the use/non-use of the running status.

Figure 13:
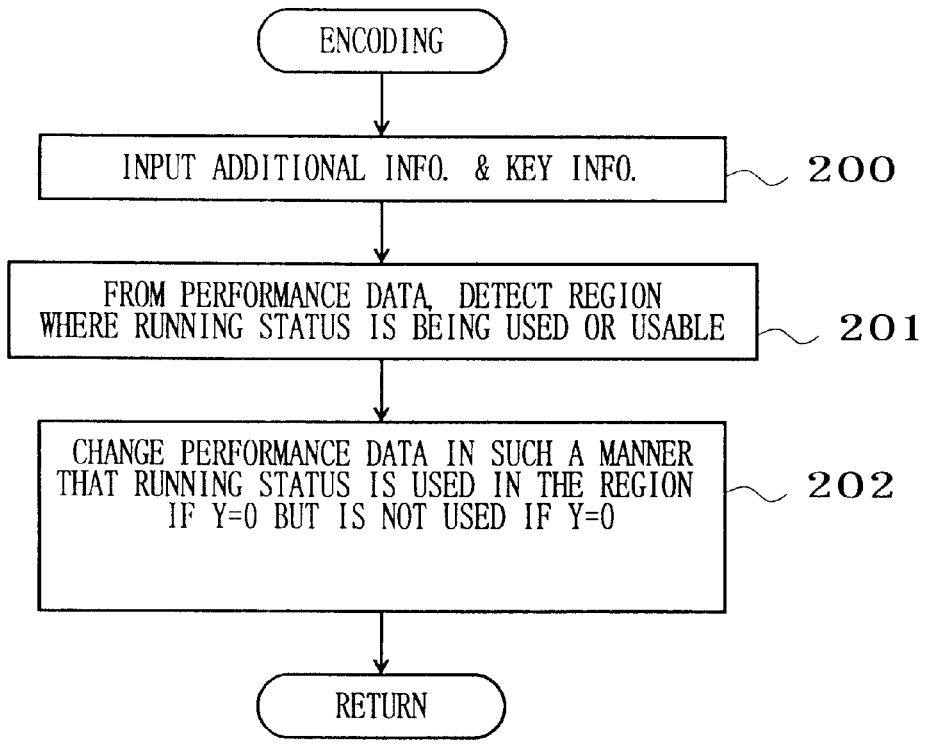
FIG. 13 is a flow chart of an encoding program in accordance with the third embodiment of the present invention.

FIG. 13 is a flow chart showing an example of the program capable of implementing the encoding process in accordance with the third embodiment as briefed above. At first step 200, the additional information Y to be embedded and key information KEY is input to the inventive computer apparatus. Although this encoding algorithm is relatively simple and thus does not necessarily require particular key information KEY, such key information KEY may be used to designate a particular range of the performance data in a case where the encoding process is to be performed on that particular range. At following step 201, a region where the running status is being used or usable is detected from among the performance data (main information). At next step 202, the contents of the performance data in the detected region are changed (set) in accordance with the value (1 or 0) of the additional information Y so that the running status is used or prevented from being used in that region. If Y=1, then the performance data in the detected region is changed so as to permit the use of the running status, but if Y=0, the performance data in the detected region is changed so as to inhibit the use of the running status.

In the above-mentioned manner, the one-bit electronic watermark information can be embedded in the main information without the execution of the music performance being influenced by the use/non-use of the running status. In principle, embedding a plurality of bits of the additional information is permitted by embedding the one-bit electronic watermark information for each channel or for each predetermined range of the performance sequence. In that case, the manner of interlinking the additional information embedded at the different bits may be selected as desired, as previously noted. Such a third embodiment of the present invention is very useful for diversifying the form of the electronic watermark information embedding. The diversification in the form of the electronic watermark information embedding is very advantageous in that a combination thereof provides for a complicated encoding process with contents very hard to read or see through.

Figure 14:
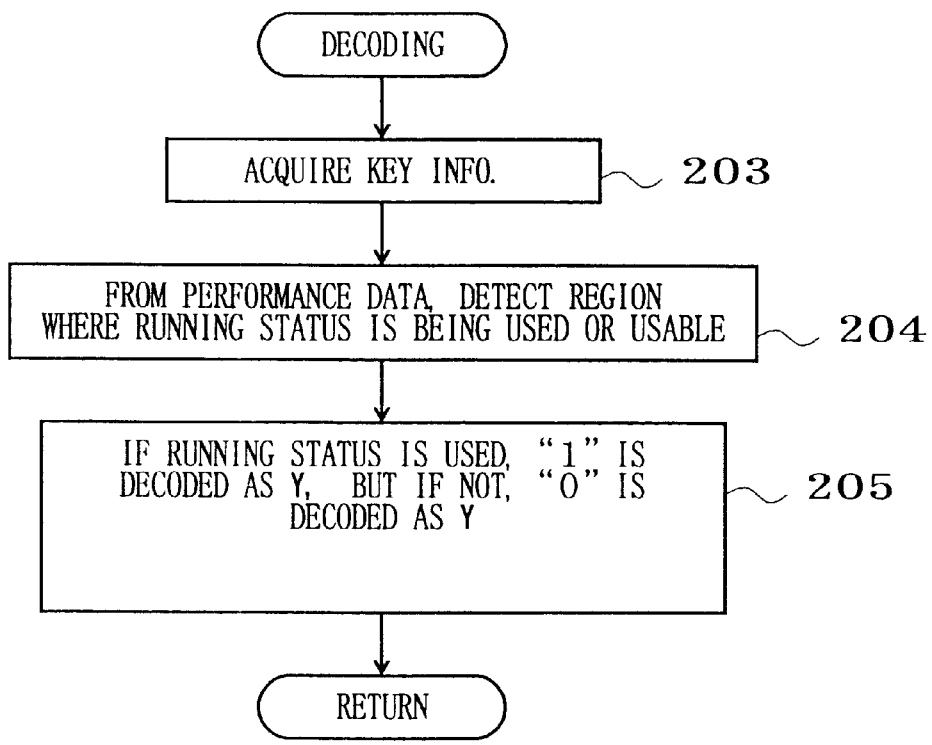
FIG. 14 is a flow chart of a decoding program in accordance with the third embodiment of the present invention.

The following paragraphs describe an exemplary manner in which the additional information Y is decoded from the performance data having embedded therein the watermark information corresponding to the desired additional information Y in accordance with the encoding scheme of FIG. 13, with reference to FIG. 14 showing an example of a program directed to the decoding process. The manner of decoding the additional information shown in FIG. 14 is generally the same in principle as the above-mentioned decoding processes and comprises inversely executing the encoding algorithm of FIG. 13. First, the decoding key information KEY, if any, is acquired through appropriate means at step 203. Then, at step 204, the region where the running status is being used or usable is detected, on the basis of the acquired key information KEY, from among the performance data in the encoded range. If the running status is being used in the detected region, then the value "1" is decoded as the additional information Y, while if the running status is not being used in the detected region, then the value "0" is decoded as the additional information Y, at step 205.

The above-described third embodiment may be based on detection of any other specific status than the running status, as long as the use/non-use of information indicative of the specific status does not significantly influence the reproductive performance. In this modification, by controlling the use/non-use of such a specific status, a one-bit electronic watermark corresponding to the additional information Y can be embedded just as in the above-described embodiment. Note-off status is among examples of the other specific status.

[Fourth Embodiment]

Next, a fourth preferred embodiment of the present invention will be described. The fourth preferred embodiment is characterized by embedding electronic watermarks of desired additional information Y by manipulating values of performance data similarly to the above-described second and third embodiments. For example, the fourth embodiment is designed to embed electronic watermarks of desired a additional information Y by manipulating or controlling the number of spaces in text data included in non-performance data such as MIDI meta event data.

In the MIDI message, there can be inserted event data of non-performance data called meta event data, in addition to event data of performance data that is directed to directly controlling a music performance. As such meta event data, a text of the copyright information as mentioned above or any other desired text can be embedded. Changing the number of spaces in such text data to a not-so-great extent will not at all influence the reproductive performance, neither will it influence the substance of the text. Thus, a plurality of bits of electronic watermarks corresponding to the additional information can be embedded by performing such data manipulation as to set the number of the spaces in the text data in accordance with the value of the additional information.

Figure 15:
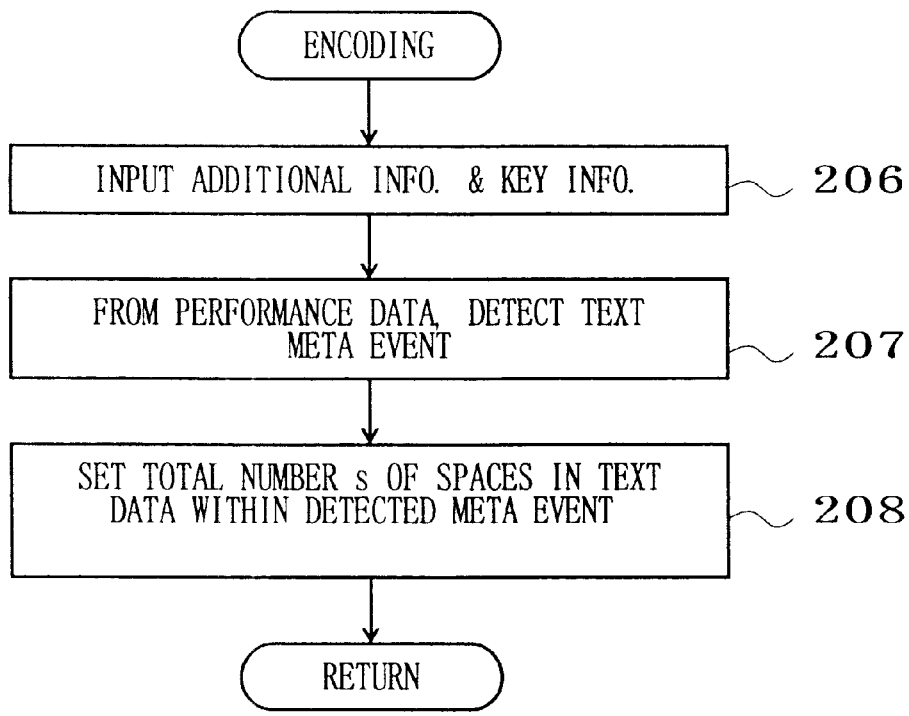
FIG. 15 is a flow chart of an encoding program in accordance with the fourth embodiment of the present invention.

FIG. 15 is a flow chart showing an example of the program capable of implementing the encoding process in accordance with the fourth embodiment as briefed above. At first step 206, the additional information Y to be embedded and key information KEY is input to the inventive computer apparatus. Although this encoding algorithm is also relatively simple and thus does not necessarily require particular key information KEY, such key information KEY may be used to designate a particular range of the performance data in a case where the encoding process is to be performed on that particular range. At following step 207, a meta event containing text data is detected from the performance data (main information). Then, at step 208, the number s of the spaces in the text data contained in the detected meta event is set to a value corresponding to the value of the additional information Y. For example, when the additional information Y takes a value of three bits in the binary notation, then the total number s of the spaces is set to any one of values "0"–"7". More specifically, if the value of the additional information Y is "4", setting (addition or deletion) of the space data is made such that the total number s of the spaces in the text data of the meta event amounts to "4".

By setting the total number s of the spaces in the text data in accordance with the value of the additional information Y as mentioned above, it is possible to embed electronic watermarks of the additional information Y which consist of data of several bits in the binary notation. In this case too, the form of the electronic watermark information embedding can be highly diversified, which is very useful for building a complicated encoding process with contents very hard to read or see through.

Figure 16:
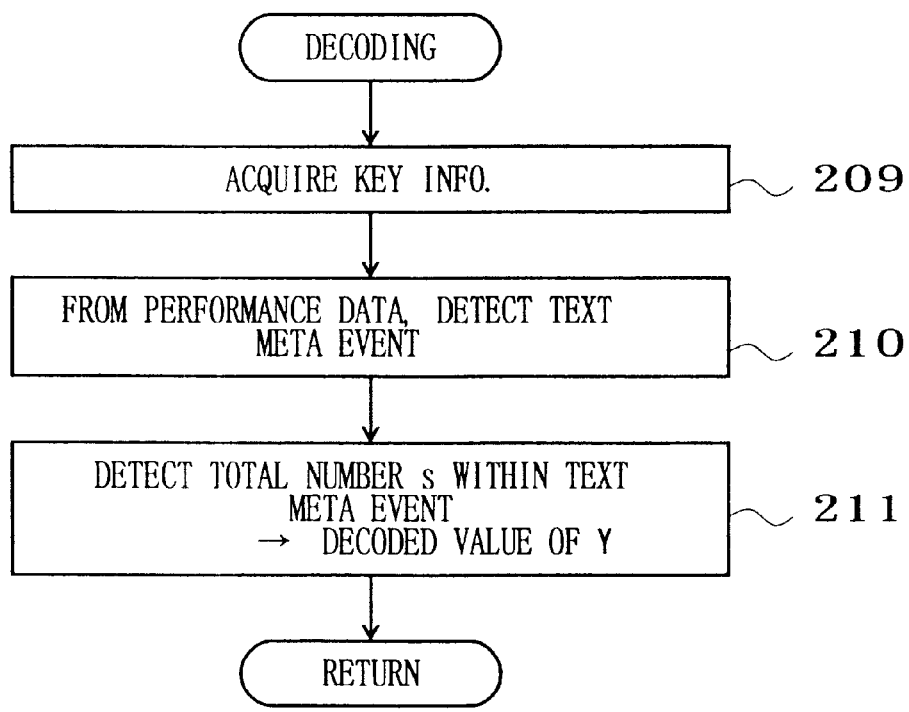
FIG. 16 is a flow chart of a decoding program in accordance with the fourth embodiment of the present invention.

The following paragraphs describe an exemplary manner in which the additional information Y is decoded from the performance data having embedded therein the watermark information corresponding to the desired additional information in accordance with the encoding scheme of FIG. 15, with reference to FIG. 16 showing an example of a program directed to the decoding process. The manner of decoding the additional information shown in FIG. 16 is generally the same in principle as the above-mentioned decoding processes and comprises inversely executing the encoding algorithm of FIG. 15. First, the decoding key information KEY, if any, is acquired through appropriate means at step 209. Then, at step 210, a text meta event (non-performance data) is detected from among the performance data in the encoded range, on the basis of the acquired key information KEY. Then, the total number s of the spaces in the detected text meta event is detected at step 211. The thus-detected number s of the spaces represents a decoded output of the additional information Y.

As a modification of the fourth embodiment, additional information Y of binary one bit can be embedded by setting the number of the spaces between a pair of adjacent words (i.e., "between-word spaces") in the text meta event (non-performance data). For example, the number of the spaces between words is set to "1" when Y=0, and set to "2" when Y=0. This modification can increase the number of bits of the additional information Y that can be embedded in the main information, by being used in combination with the encoding process based on the total number s of the spaces in the text meta event. In such a case, a further modification may be made such that the total number s of the spaces is counted in a normal fashion when the number of the between-word spaces is set at "1" but is halved when the number of the between-word spaces is set at "2".

[Fifth Embodiment]

Next, a fifth preferred embodiment of the present invention will be described. The fifth preferred embodiment is characterized by inserting, in performance data, dummy data that does not impose substantial adverse influences on a reproductive music performance, to thereby embed electronic watermarks of desired additional information Y corresponding to the dummy data.

As an example, dummy data may be added right after given performance control data or non-performance data by duplicating or repeating the same performance control data or non-performance data. For example, even where two identical performance control data, each instructing that a given effect should be changed to another effect, are arranged in succession, the redundant arrangement of the identical performance control data does not adversely influence the music performance, because the effect is changed only once in response to first occurrence of the performance control data and the changed effect is maintained in next occurrence of the performance control data. Therefore, such performance control data can be used appropriately as the dummy data. Even when a plurality of identical non-performance data, such as MIDI meta events, are arranged in succession, a same meta event process is repeated, and the redundant arrangement of the identical non-performance data does not adversely influence the music performance. Thus, in this case too, one-bit electronic watermark information can be embedded, depending on the presence/absence of the dummy data, without the music performance being adversely influenced. In this embodiment too, the form of the electronic watermark information embedding can be highly diversified, which is very useful for building a complicated encoding process with contents very hard to read or see through.

Figure 17:
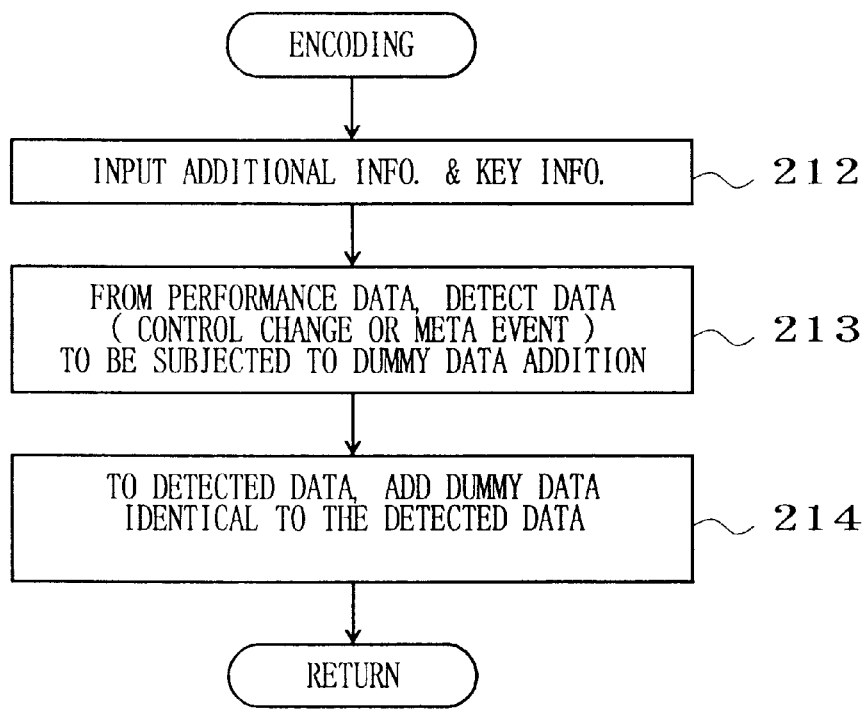
FIG. 17 is a flow chart of an encoding program in accordance with the fifth embodiment of the present invention.

FIG. 17 is a flow chart showing an example of the program capable of implementing the encoding process in accordance with the fifth embodiment as briefed above. At first step 212, the additional information Y to be embedded and key information KEY is input to the inventive computer apparatus. Although this encoding algorithm is also relatively simple and thus does not necessarily require particular key information KEY, such key information KEY may be used to designate a particular range of the performance data when the encoding process is to be performed on that particular range. The key information KEY may also designate particular data to which dummy data is to be added. At following step 213, the particular data to which dummy data is to be added (which should be subjected to a dummy data addition process) is detected from among the performance data (main information). For example, a control change event (performance control data) or a meta event (non-performance data) may be subjected to the dummy data addition process. In such a case, the key information KEY may designate either or both of the control change event (performance control data) and meta event (non-performance data) that should be subjected to the dummy data addition process, and step 213 detects the data thus designated by the key information KEY. At next step 214, a particular number of dummy data identical to the data detected at step 213, corresponding to the value of the additional information Y, are added right after the detected data. For example, in a situation where additional information Y of one binary bit is to be embedded in the main information, no dummy data is added if Y=0, but one dummy data is added if Y=1. Further, an option of adding a plurality of identical dummy data is possible in this embodiment, which permits embedding of additional information Y of two or more bits.

Figure 18:
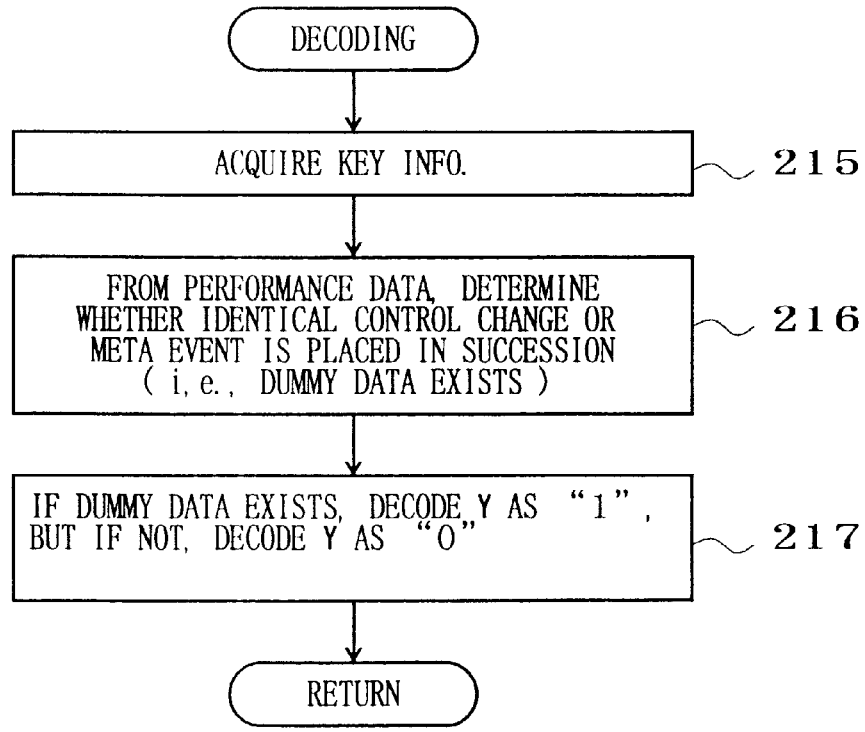
FIG. 18 is a flow chart of a decoding program in accordance with the fifth embodiment of the present invention.

The following paragraphs describe an exemplary manner in which the additional information Y is decoded from the performance data having embedded therein the watermark information corresponding to the desired additional information in accordance with the encoding scheme of FIG. 17, with reference to FIG. 18 showing an example of a program directed to the decoding process. The manner of decoding the additional information Y shown in FIG. 18 is generally the same in principle as the above-mentioned decoding processes and comprises inversely executing the encoding algorithm of FIG. 17. First, the decoding key information KEY is acquired through appropriate means at step 215. Then, at step 216, data (control change event or meta event) that should be subjected to the dummy data addition process is detected on the basis of the thus-acquired key information KEY, and it is further determined whether a succession of identical data, i.e. dummy data, exists. If such dummy data exits, the additional information Y is decoded as "1", but if not, the additional information Y is decoded as "0".

As a modification of the fifth embodiment, time information (interval data ΔT) indicative of a time position of the dummy data may be set in accordance with the value of desired additional information Y to thereby embed, in the main information, the additional information Y of the value corresponding to the time information. For this purpose, the operation at step 212 of FIG. 17 may be modified so as to input additional information Y consisting of data of plural bits, and the operation at step 214 may be modified such that it is terminated without adding dummy data when the value of the additional information Y is "0", but, when the value of the additional information Y is greater than "0", adds dummy data and sets the event timing (i.e., interval data ΔT) of the dummy data to a value corresponding to the additional information value Y. In this case, the decoding process of FIG. 18 may be modified such that if any dummy data exists, step 217 retrieves data of a time length till the event timing of the dummy data (i.e., interval data ΔT) so as to output the interval data ΔT as a decoded value of the additional information Y.

As a further modification of the fifth embodiment, a desired one of the tone generator channels may be set as a dummy channel that is not used for tone generation purposes, and there may be embedded an electronic watermark of a value corresponding to the thus-set dummy channel. For example, in a case where an electronic watermark of additional information Y is embedded by setting any one of 15 tone generator channels 0–8 and 10–15 as the dummy channel, the additional information Y taking any one of 15 different values can be embedded in the main information. For example, when the value of the additional information Y is "8", tone generator channel 8 of channel position 8 is set as the dummy channel. Then, in case any performance data set has already been assigned to tone generator channel 8, it is only necessary that the performance data set be reassigned to another empty or available tone generator channel. The decoding process in this case is performed by detecting the dummy channel from among the plural channels associated with the performance data and then decoding the value of the additional information Y on the basis of the channel position (i.e., position determined with percussive instrument channel 9 excepted) of the dummy channel. Note that the dummy data is set in this case by setting up a dummy channel flag and clearing, as necessary, the dummy channel to ensure that no note-on event exists in the dummy channel.

[Sixth Embodiment]

Next, a sixth preferred embodiment of the present invention will be described. The sixth preferred embodiment is characterized by changing a statistical distribution pattern of predetermined ones of music performance data constituting main information by use of a predetermined encoding algorithm and in accordance with desired additional information, to thereby embed the additional information as electronic watermarks corresponding to the changed state of the statistical distribution pattern.

An example of this encoding scheme will be explained below.

Velocity data in note-on events of all performance data for a single music piece (or a predetermined range thereof) are classified into a plurality of groups according to a predetermined criterion, and a predetermined statistical value is evaluated for each of the classified groups of the velocity data. Then, an encoding process is performed such that a distribution pattern of the thus-evaluated statistical values is changed or set in accordance with a value of additional information Y to be embedded.

More specifically, the number n of the groups into which the velocity data Vel are to be classified is first set by first key information KEY1. The following description will be made on the assumption that the number n of the groups is set to "4" (n=4).

Then, a function "f(Vel)" for classifying the velocity data Vel is defined by second key information KEY2. As an example, the following description will be made based on the assumption of f(Vel)=Vel mod n . . . (Mathematical Expression 6) Here, "Vel" represents a value of the velocity data Vel; namely, f(Vel) is a remainder of a quotient obtained by dividing the value of the velocity data Vel by the value "n" indicated by the first key information KEY1. When n=4, the remainder takes any one of four different values, 0, 1, 2 and 3, and thus the velocity data Vel in all the entire performance data are classified into groups 0–3, as shown in Table 1 below, in accordance with the remainder values. Further, ratios of the data, belonging to the respective groups, relative to the total number of the data (which are represented here by $R_0\%$ $R_1\%$, $R_2\%$ and $R_3\%$, respectively) are determined and the thus-determined ratios are shown as an original distribution pattern OP.

TABLE 1

|  | f(Vel) | OP |
| --- | --- | --- |
| Group 0 | Vel mod 4 = 0 | $R_0$ % |
| Group 1 | Vel mod 4 = 1 | $R_1$ % |
| Group 2 | Vel mod 4 = 2 | $R_2$ % |
| Group 3 | Vel mod 4 = 3 | $R_3$ % |

Here, $R_0\%+R_1\%+R_2\%+R_3\%=100\%$, and if the original distribution pattern OP represents a fully-averaged or uniform distribution, then a relationship of "$R_0\%=R_1\%=R_2\%=R_3\%=25\%$" is established. The thus-determined original distribution pattern OP is stored as necessary so that it can be subsequently used as third decoding key information KEY3.

Then, encoding of electronic watermarks corresponding to desired additional information Y is carried out by changing the original distribution pattern OP into any one of four changed distribution patterns P1, P2, P3 and P4 in accordance with the additional information Y capable of taking any one of four different values. The encoding algorithm used in this case can be expressed as follows:

Pattern P1 (e.g., when Y=0):
for Group 0: arithmetic operations of "+0" and "+1" are performed half-and-half, i.e., alternately;
for Group 1: arithmetic operations of "+0" and "+1" are performed half-and-half;
for Group 2: arithmetic operations of "+0" and "−1" are performed half-and-half; and
for Group 3: arithmetic operations of "+0" and "−1" are performed half-and-half In the encoding algorithm noted above, the phrase "arithmetic operations of +0 and +1 are performed half-and-half" means performing an arithmetic operation of "+0" on half of the velocity data Vel in the group and an arithmetic operation of "+1" on the remaining half of the velocity data Vel. Thus, although the velocity data Vel having been arithmetically operated by "+0" each remain in the same group, the other velocity data Vel having been arithmetically operated by "+1" each shift to another group of a lower order (for convenience of description, the words "lower order" used in this context mean a greater group number while the words "upper order" means a smaller group number). More specifically, as regards group 0 for which "Vel mod 4" is originally "0", "Vel mod 4" becomes "1" as the velocity data Vel are arithmetically operated by "+1"; thus, the velocity data Vel shift to group 1. Of course, the arithmetic operation "+1" or "−1" is applied to the lowermost bit of the velocity data Vel, and thus a very little change will occur in the velocity data Vel. Because such a "+1" or "−1" change at the lowermost bit of tone volume data, such as the velocity data, is hardly perceivable by human listeners, it does not at have adverse influences on the reproductive performance.

Further, the phrase "arithmetic operations of +0 and −1 are performed half-and-half" means performing an arithmetic operation of "+0" on half of the velocity data Vel in the group and an arithmetic operation of "−1" on the remaining half of the velocity data Vel. Thus, although the velocity data Vel having been arithmetically operated by "+0" each remain in the same group, the other velocity data Vel having been arithmetically operated by "−1" each shift to another group of an upper order. More specifically, as regards group 3 for which "Vel mod 4" is originally "3", "Vel mod 4" becomes "2" as the velocity data Vel are arithmetically operated by "−1"; thus, the velocity data Vel shift to group 2.

As a result, the respective statistical values of the individual groups in pattern 1 above have been changed relative to the original distribution patter OP as follows:

Statistical (Statistical Value) Distribution of Pattern 1:
Group 0: $(R_0/2)\% \rightarrow 12.5\%$
Group 1: $(R_0/2)+(R_1/2)+(R_2/2)\% \rightarrow 37.5\%$
Group 2: $(R_1/2)+(R_2/2)+(R_3/2)\% \rightarrow 37.5\%$
Group 3: $(R_3/2)\% \rightarrow 12.5\%$ Note that each of the figures noted after the "→" mark is a concrete figure based on the assumption of "$R_0\%=R_1\%=R_2\%=R_3\%=25\%$".

Figure 19:
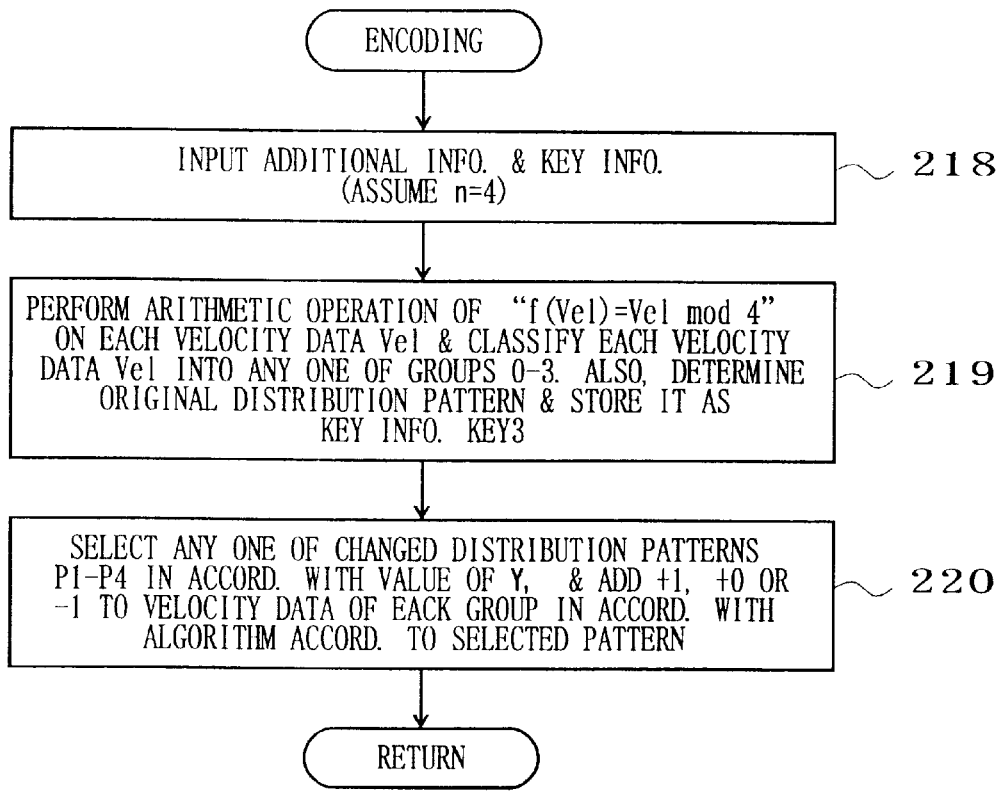
FIG. 19 is a flow chart of an encoding program in accordance with the sixth embodiment of the present invention.

Encoding algorithms and statistical value distributions obtained as a result of the encoding of other patterns 2–4 are as follows:

Pattern P2 (e.g., when Y=1):
for Group 0: arithmetic operations of "+0" and "+1" are performed half-and-half;
for Group 1: arithmetic operations of "+0" and "−1" are performed half-and-half;
for Group 2: arithmetic operations of "+0" and "−1" are performed half-and-half; and
for Group 3: arithmetic operations of "+0" and "+1" are performed half-and-half
Statistical (Statistical Value) Distribution of Pattern 2:
Group 0: $(R_0/2)+(R_1/2)+(R_3/2)\% \rightarrow 37.5\%$
Group 1: $(R_0/2)+(R_1/2)+(R_2/2)\% \rightarrow 37.5\%$
Group 2: $(R_2/2)\% \rightarrow 12.5\%$
Group 3: $(R_3/2)\% \rightarrow 12.5\%$ Pattern P3 (e.g., when Y=2):
for Group 0: arithmetic operations of "+0" and "−1" are performed half-and-half;
for Group 1: arithmetic operations of "+0" and "−1" are performed half-and-half;
for Group 2: arithmetic operations of "+0" and "+1" are performed half-and-half; and for Group 3: arithmetic operations of "+0" and "+1" are performed half-and-half Statistical (Statistical Value) Distribution of Pattern 3:
- Group 0: $(R_0/2)+(R_1/2)+(R_3/2)\% \rightarrow 37.5\%$
- Group 1: $(R_1/2)\% \rightarrow 12.5\%$
- Group 2: $(R_2/2)\% \rightarrow 12.5\%$
- Group 3: $(R_0/2)+(R_2/2)+(R_3/2)\% \rightarrow 37.5\%$ Pattern P4 (e.g., when Y=3):
- for Group 0: arithmetic operations of "+0" and "−1" are performed half-and-half;
- for Group 1: arithmetic operations of "+0" and "+1" are performed half-and-half;
- for Group 2: arithmetic operations of "+0" and "+1" are performed half-and-half; and
- for Group 3: arithmetic operations of "+0" and "−1" are performed half-and-half Statistical (Statistical Value) Distribution of Pattern 4:
- Group 0: $(R_0/2)\% \rightarrow 12.5\%$
- Group 1: $(R_1/2)\% \rightarrow 12.5\%$
- Group 2: $(R_1/2)+(R_2/2)+(R_3/2)\% \rightarrow 37.5\%$
- Group 3: $(R_0/2)+(R_2/2)+(R_3/2)\% \rightarrow 37.5\%$ For the purpose of implementing the encoding process in the above-described manner, it is only necessary to build an appropriate program. FIG. 19 is a flow chart showing an example of the program capable of implementing the above-described encoding process. At first step 218, additional information Y to be embedded and first and second key information KEY1 and KEY2 is input to the inventive computer apparatus. For convenience, this program is also described here on the above-mentioned assumption that the value n designated by the first key information KEY1 is 4 (n=4) and the encoding function designated by the second key information KEY2 is as shown in Mathematical Expression 6 above. At next step 219, the arithmetic operation of Mathematical Expression 6 is performed on each of the velocity data Vel, and then each of the velocity data Vel is classified into any one of groups 0–3 as shown in Table 1 above. Further, a predetermined statistical process is performed for each of groups 0–3, to thereby determine an original distribution pattern as also shown in Table 1 and store the thus-determined original distribution pattern as third key information KEY3 as necessary. Then, at step 220, any one of the changed distribution patterns P1–P4 is selected in accordance with the value of the additional information Y, and the value of each of the velocity data Vel in groups 0–3 is subjected to an arithmetic operation of "+1" or "+0" or "−1" in accordance with the algorithm corresponding to the selected changed distribution pattern P1–P4. Statistical value distribution pattern of the thus-changed velocity data presents characteristics corresponding to those of the statistical distribution of the selected distribution pattern P1–P4. In this manner, the value of each of the velocity data Vel in the performance data is changed by a very slight amount of "+1" or "+0" or "−1" so that the changed velocity data Vel present a statistical distribution pattern corresponding to the value of the additional information Y.

Figure 20:
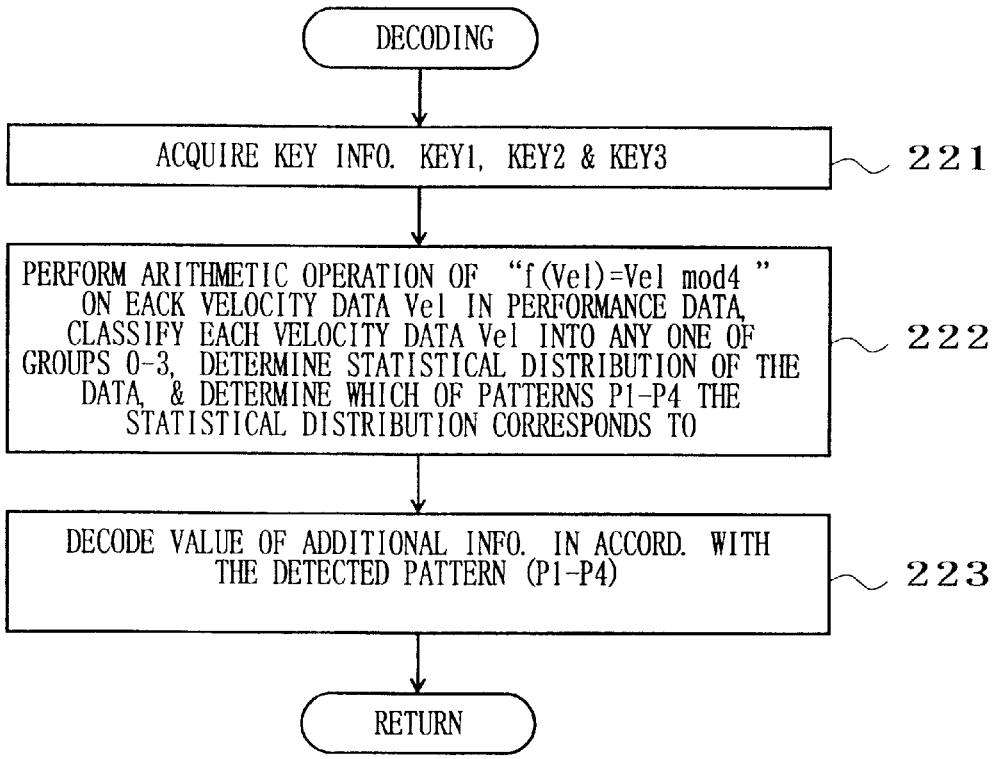
FIG. 20 is a flow chart of a decoding program in accordance with the sixth embodiment of the present invention.

The following paragraphs describe an exemplary manner in which the additional information Y is decoded from the performance data having embedded therein the watermark information corresponding to the desired additional information Y in accordance with the encoding scheme of FIG. 19, with reference to FIG. 20 showing an example of the decoding process. The manner of decoding the additional information Y shown in FIG. 20 is generally the same in principle as the above-described decoding processes and comprises inversely executing the encoding algorithm of FIG. 19. First, the decoding key information KEY1, KEY2 and KEY3 is acquired through appropriate means at step 221. Then, at next step 222, the arithmetic operation of Mathematical Expression 6 is performed on each of the velocity data Vel, and then each of the velocity data Vel is classified into any one of groups 0–3. Further, a predetermined statistical process is performed for each of groups 0–3, to thereby determine a statistical distribution pattern of the velocity data. Also, it is ascertained which one of the changed distribution patterns P1–P4 the thus-determined statistical distribution pattern corresponds to. At that time, an operation is also carried out for detecting the changed distribution patterns P1–P4 utilizing the individual statistical values $R_0$, $R_1$, $R_2$ and $R_3$ of the original distribution pattern that is given as the key information KEY3. At next step 223, the value of the additional information Y is decoded in accordance with the detected patterns P1–P4.

Namely, the sixth embodiment, which is constructed to change the statistical distribution pattern of predetermined ones of the performance data, can effectively aid in preventing an unauthorized dishonest user from maliciously tampering with or altering the information and can also appropriately cope with unintentional or unconscious alteration, by an authorized user, of the additional information, because there is only a low possibility of the statistical distribution pattern greatly changing even when part of the performance data is tampered with or altered through editing whether intentionally or unintentionally. Further, the sixth embodiment thus arranged can significantly diversify the form of embedding of the electronic watermark information, which is very useful for building a complicated encoding process with contents very hard to read or see through. Furthermore, because the electronic watermark information is indicated indirectly by the statistical distribution pattern, rather than directly by changed amounts of the predetermined data, the predetermined data are changed in value by a very slight amount like "+1" or "−1" as set forth above, and such a slight change in the values of the predetermined data does not have any adverse influences on the reproductive music performance if data that would not be significantly affected by a difference of "+1" or "−1" are used as the predetermined data to be subjected to the above-described data value changing process. Of course, the data to be subjected to the data value changing process may be other data than the velocity data, such as time information.

Further, even when one or more of the velocity data has been changed by editing, such a change in the velocity data through the editing can be properly recognized as long as the statistical distribution determined at step 222 in the decoding process of FIG. 20 is greatly different from any one of the changed distribution patterns P1–P4, because the original distribution pattern OP is indicated by the key information KEY 3. In addition, the edited details can be surmised properly to some extent, as a result of which the additional information Y can be decoded accurately.

The encoding scheme according to the sixth embodiment can be applied individually to each of the channels, or each of predetermined partial sections or various other groups of a performance sequence, so that it can embed a plurality of different kinds of additional information Y. Further, even within a single channel, the encoding scheme can embed a different kind of additional information Y as electronic watermarks for each of various note number groups (i.e., key ranges). Fourth key information KEY4 may be used in the decoding process to indicate with which of the grouping the plural kinds of additional information Y are encoded, to thereby facilitate the decoding process.

[Seventh Embodiment]

Next, a seventh preferred embodiment of the present invention will be described. The seventh preferred embodiment is characterized by embedding a plurality of pieces of electronic watermark information in relation to a single item of additional information, to thereby embed electronic watermarks of the single item of additional information in the form of the plurality of pieces of electronic watermark information interrelated with each other. Thus, the seventh embodiment can even further enhance the advantageous effect of the electronic watermarks and therefore is very useful for building a complicated encoding process with contents very hard to read or see through. Further, this seventh embodiment can increase the number of bits, i.e. data quantity, of a single item of additional information that can be imparted to main information.

In a first example of the seventh embodiment, the single item of additional information Y is divided into a plurality of portions (e.g., an upper bit portion Ya and a lower bit portion Yb), so that a different piece of electronic watermark information is embedded into the main information for each of the divided additional information portions Ya and Yb. In this case, subsequent reproduction of the additional information Y is carried out by decoding the respective pieces of electronic watermark information (Ya and Yb) from the main information and then combining the divided additional information portions Ya and Yb corresponding to the thus-decoded electronic watermark information.

In a second example of the seventh embodiment, at least a part of the additional information is embedded, as first electronic watermark information Y, into the main information in accordance with a predetermined first encoding algorithm, during which time decoding key information KEY' corresponding to the first encoding algorithm is embedded, as second electronic watermark information Y', into the main information. In this case, subsequent reproduction of the additional information Y is carried out by decoding the second electronic watermark information Y' from the main information and then decoding the first electronic watermark information Y from the main information using the thus-decoded second electronic watermark information Y' as the decoding key information KEY'.

Figure 21:
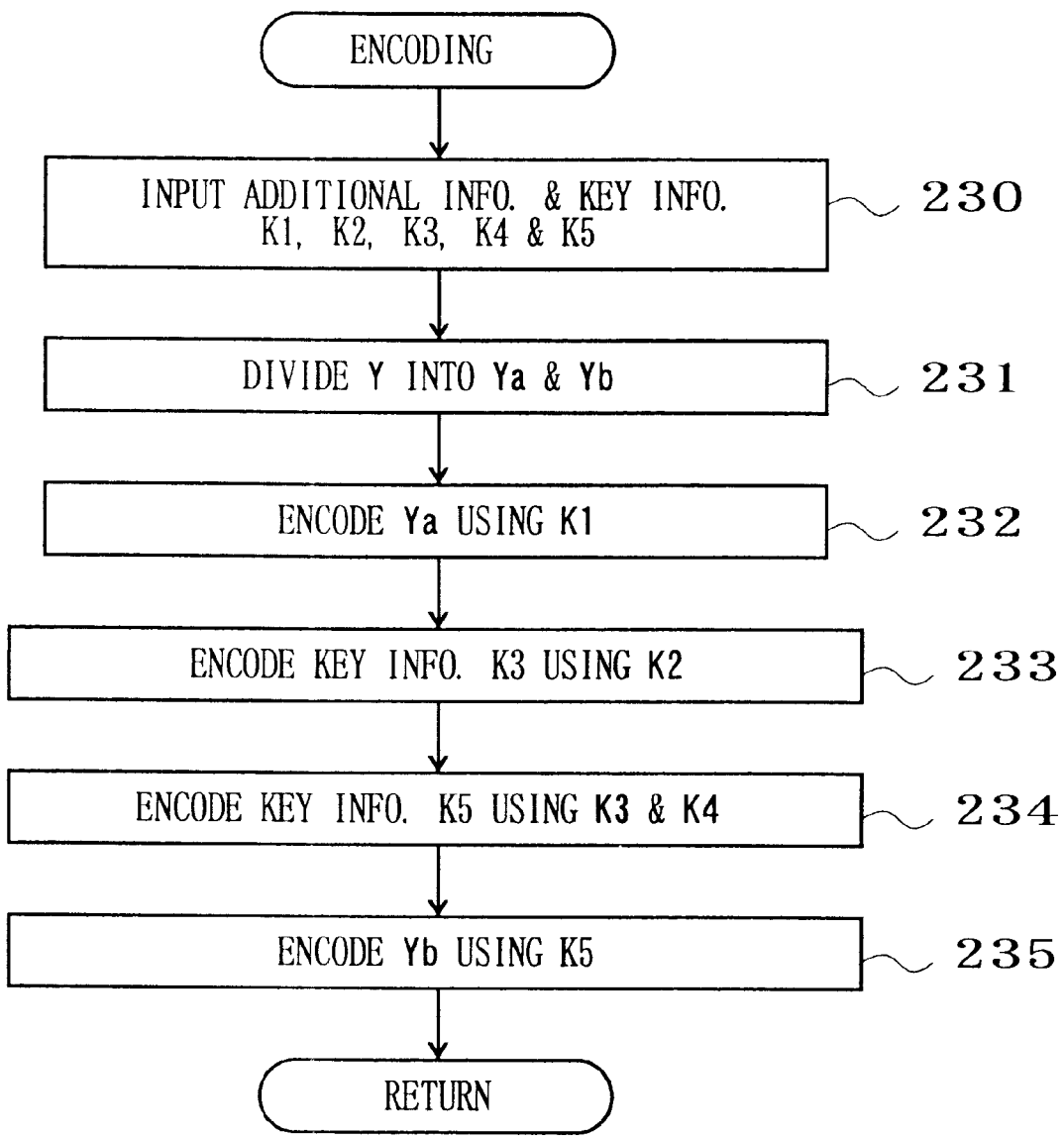
FIG. 21 is a flow chart of an encoding program in accordance with the seventh embodiment of the present invention.

FIG. 21 is a flow chart showing an exemplary program based on an encoding algorithm for implementing both of the above-mentioned first and second examples of the seventh embodiment. At first step 230, additional information Y to be embedded and a plurality of items of key information K1, K2, K3, K4 and K5 are input to the inventive computer apparatus. At next step 231, a single item of the additional information Y is divided into a plurality of portions (e.g., an upper bit portion Ya and a lower bit portion Yb). At following step 232, one of the divided additional information portions Ya is embedded (encoded) into the main information in accordance with a predetermined encoding algorithm A1 and using the first key information K1. At next step 233, the third key information K3 is embedded (encoded) into the main information in accordance with another predetermined encoding algorithm A2 and using the second key information K2. Then, at step 234, the fifth key information K5 is embedded (encoded) into the main information in accordance with still another predetermined encoding algorithm A3 and using the third and fourth key information K3 and K4. At following step 235, the other divided additional information portions Yb is embedded (encoded) into the main information in accordance with yet another predetermined encoding algorithm A4 and using the fifth key information K5. In this way, the individual divided additional information portions Ya and Yb and the key information K3 and K5 are embedded (encoded) into the main information. Here, it is only necessary for the other key information K1, K2 and K4 to be supplied via appropriate means to the user at the time of decoding. Note that one and the same algorithm may be used as the above-mentioned encoding algorithms A1–A4 or these encoding algorithms A1–A4 may be different from each other. It should also be appreciated that any of the encoding algorithms described in relation to the first to sixth embodiments may be used in the seventh embodiment as necessary.

FIG. 22 is a block diagram showing exemplary inter-algorithmic connections, which is particularly explanatory of an exemplary procedure for decoding the additional information Y from among a data group of the main information having embedded therein, through the encoding scheme of FIG. 21, the plural pieces of electronic watermark information corresponding to the desired additional information Y. In FIG. 22, reference characters A1, A2, A3 and A4 represent blocks for executing decoding algorithms corresponding to the above-mentioned encoding algorithms A1–A4. Namely, block A1 decodes the divided additional information portion Ya, embedded in the main information in accordance with the encoding algorithm A1, by use of the first key information K1. Block A2 decodes the third key information K3, embedded in the main information in accordance with the encoding algorithm A2, by use of the second key information K2 given as an initial value. Block A3 decodes the fifth key information K5, embedded in the main information in accordance with the encoding algorithm A3, by use of the decoded third key information K3 and fourth key information K4 supplied separately therefrom. Block A4 decodes the other divided additional information portion Yb, embedded in the main information in accordance with the encoding algorithm A4, by use of the decoded fifth key information K5. Then, the necessary additional information Y is acquired by combining the thus-decoded divided additional information portions Ya and Yb.

Note that in FIG. 22, data is fed from block A4 back to block A2 and this fed-back data is used as the second key information K2 in block A2. By thus causing the key information K2 to loop, it is possible to vary the content of the key information K2 over time during the decoding so that different items of additional information can be decoded sequentially with the passage of time.

FIG. 23 is a block diagram showing another example of inter-algorithmic connections, which is particularly explanatory of another example of the procedure for decoding the additional information Y. In FIG. 23, blocks B1, B2, B3 and B4 execute algorithms for decoding respective pieces of electronic watermark information encoded in accordance with predetermined encoding algorithms B1–B4. Namely, block B1 decodes additional information Y1, embedded in the main information in accordance with the encoding algorithm B1, by use of the first key information K1, and also decodes the second key information K2 embedded in the main information. Block B2 decodes the fourth key information K4, embedded in the main information in accordance with the encoding algorithm A3, by use of the decoded second key information K2 and third key information K3 supplied separately therefrom. Block B3 decodes the fifth key information K5, embedded in the main information, by use of the decoded fourth key information K4. Further, in FIG. 23, a feedback loop for the third key information K3 is formed from block B3 to block B2. Block B4 decodes additional information Y2, embedded in the main information, by use of the decoded fifth key information K5 and sixth key information K6 supplied separately therefrom. In this way, the two items of additional information Y1 and Y2 are decoded. Note that the connections between the decoding algorithms as shown in FIGS. 22 and 23 may be set in accordance with appropriate key information.

The present invention may be practiced not only in the form as described above in relation to the preferred embodiments but also in any other modified form. Further, the present invention may be practiced not only by executing the inventive software programs via a computer, microprocessor or DSP (Digital Signal Processor), but also by organizing an apparatus or system, capable of performing the same functions as the above-described embodiments, using hardwired logic composed of an IC, LSI or discrete circuits so that the inventive encoding process and/or decoding process.

In relation to all of the above-described embodiments, the present invention may be constructed as a method or apparatus for incorporating and storing additional information in main information. Besides, the present invention may be constructed as a machine-readable storage medium storing programs for implementing the method. Furthermore, the present invention may be implemented as a storage medium containing data of a novel data format recorded in accordance with the inventive method.

Further, in relation to all of the above-described embodiments, the present invention may be constructed as a method or apparatus for extracting and reproducing additional information from among main information having the additional information incorporated and stored therein. In addition, the present invention may be constructed as a machine-readable storage medium storing programs for implementing such an inventive method.

It should also be appreciated that in all of the above-described embodiments, the hardware apparatus shown in FIG. 1 may be replaced by another electronic apparatus/equipment including a processor such as a microprocessor or DSP, rather than being limited to a personal computer. Further, the present invention is applicable not only to the fields of music-performance reproducing equipment or electronic musical instrument and tone synthesizing/controlling processing as described above but also to other fields handling any types of electronic information. In the case where the present invention is applied to the fields where music performance data are handled, the data performance data may be organized in any desired format instead of being limited to the one illustratively shown in FIG. 3.

It should also be obvious that in all of the above-described embodiments, only one or more, rather than all, of necessary items of additional information may be embedded in the main information. In this case, the remaining items of additional information may be stored separately in an appropriate storage area.

In relation to all of the above-described embodiments, the main information having desired additional information embedded therein may be transmitted via a communication network. In this case, the data received by a receiving end via the communication network may be subjected to a decoding process in real time so that the additional information are decoded, in a real-time data streaming fashion, directly from the main information within the received data. If such real-time decoding is not possible, then the received data may be first buffered as appropriate and then subjected to the necessary decoding process.

In summary, the present invention having been described so far can provide a unique electronic information processing method and system and storage medium where a novel or improved scheme is employed for embedding additional information in main information. With the improved additional-information embedding scheme, the present invention achieves an electronic information processing method and system and storage medium which can effectively prevent additional information from being read or seen through and hence intentionally or maliciously altered by any unauthorized dishonest user. The present invention also achieves an electronic information processing method and system and storage medium which can effectively prevent additional information from being altered unintentionally or unconsciously by an authorized user.

What is claimed is:

1. A method of embedding additional information, as an electronic watermark, in main information including a plurality of data, said method comprising a step of changing arrangement or order of the data in the main information in accordance with a value of the additional information and with a predetermined encoding algorithm, wherein the electronic watermark of the additional information is embedded in the form of a change in the arrangement or order of the data without values of the data in the main information themselves being changed.

2. A method as claimed in claim 1 wherein the main information comprises music performance data, and the change in the arrangement or order of the data in the main information is made with respect to a factor a change of which does not substantially adversely influence music reproduction based on the music performance data.

3. A method as claimed in claim 1 wherein the main information comprises music performance data for a plurality of channels, and the change in the arrangement or order of the data in the main information is made by changing the channels of the music performance data.

4. A method as claimed in claim 1 wherein the main information comprises music performance data, and the change in the arrangement or order of the data in the main information is made by changing order of plural kinds of tone generator setting information.

5. An electronic information processing apparatus for embedding additional information, as an electronic watermark, in main information including a plurality of data, said electronic information processing apparatus comprising a processor adapted to change arrangement or order of the data in the main information in accordance with a value of the additional information and with a predetermined encoding algorithm, wherein the electronic watermark of the additional information is embedded in the form of a change in the arrangement or order of the data without values of the data in the main information themselves being changed.

6. A machine-readable storage medium containing a group of instructions to cause said machine to implement a method of embedding additional information, as an electronic watermark, in main information including a plurality of data, said method comprising a step of changing arrangement or order of the data in the main information in accordance with a value of the additional information and with a predetermined encoding algorithm, wherein the electronic watermark of the additional information is embedded in the form of a change in the arrangement or order of the data without values of the data in the main information themselves being changed.

7. A method of decoding additional information embedded, as an electronic watermark, in main information including a plurality of data, the additional information being embedded in the main information by changing arrangement or order of the data in the main information in accordance with a value of the additional information and with a predetermined encoding algorithm, said method comprising:
- a step of acquiring decoding key information corresponding to the encoding algorithm; and
- a step of inversely executing the encoding algorithm on the basis of the decoding key information acquired by said step of acquiring, to thereby decode the additional information hidden in the arrangement or order of the data in the main information.

8. An apparatus for decoding additional information embedded, as an electronic watermark, in main information including a plurality of data, the additional information being embedded in the main information by changing arrangement or order of the data in the main information in accordance with a value of the additional information and with a predetermined encoding algorithm, said apparatus comprising a processor adapted to:
- acquire decoding key information corresponding to the encoding algorithm; and
- inversely execute the encoding algorithm on the basis of the acquired decoding key information, to thereby decode the additional information hidden in the arrangement or order of the data in the main information.

9. A machine-readable storage medium containing a group of instructions to cause said machine to implement a method of decoding additional information embedded, as an electronic watermark, in main information including a plurality of data, the additional information being embedded in the main information by changing arrangement or order of the data in the main information in accordance with a value of the additional information and with a predetermined encoding algorithm, said method comprising:
- a step of acquiring decoding key information corresponding to the encoding algorithm; and
- a step of inversely executing the encoding algorithm on the basis of the decoding key information acquired by said step of acquiring, to thereby decode the additional information hidden in the arrangement or order of the data in the main information.

10. A method of embedding additional information, as an electronic watermark, in main information including a plurality of performance data, the performance data including time information, said method comprising a step of changing the time information of the plurality of performance data in the main information in accordance with a value of the additional information and with a predetermined encoding algorithm,
wherein the electronic watermark of the additional information is embedded in the form of a combination of changes of the time information in the plurality of performance data.

11. A method as claimed in claim 10 wherein the main information includes plural kinds of tone generator setting information, each of the kinds of tone generator setting information including time information that is indicative of setting timing of the tone generator setting information, and
wherein said step of changing changes the time information of the plural kinds of tone generator setting information in the main information in accordance with the value of the additional information on the basis of the predetermined encoding algorithm, to thereby embed the electronic watermark of the additional information in the form of the combination of changes of the time information in the plurality of performance data.

12. An apparatus for embedding additional information, as an electronic watermark, in main information including a plurality of performance data, the performance data including time information, said apparatus comprising a processor adapted to change the time information of the plurality of performance data in the main information in accordance with a value of the additional information and with a predetermined encoding algorithm,
wherein the electronic watermark of the additional information is embedded in the form of a combination of changes of the time information in the plurality of performance data.

13. A machine-readable storage medium containing a group of instructions to cause said machine to implement a method of embedding additional information, as an electronic watermark, in main information including a plurality of performance data, the performance data including time information, said method comprising a step of changing the time information of a plurality of the performance data in the main information in accordance with a value of the additional information and with a predetermined encoding algorithm,
wherein the electronic watermark of the additional information is embedded in the form of a combination of changes of the time information in the plurality of the performance data.

14. A method of decoding additional information embedded, as an electronic watermark, in main information including a plurality of performance data, the performance data including time information, the additional information being embedded in the form of a combination of changes of the time information of the plurality of performance data by changing the time information of the plurality of performance data in accordance with a value of the additional information and with a predetermined encoding algorithm, said method comprising:
- a step of acquiring decoding key information corresponding to the encoding algorithm; and
- a step of inversely executing the encoding algorithm on the basis of the decoding key information acquired by said step of acquiring, to thereby decode the additional information hidden in the main information.

15. An apparatus for decoding additional information embedded, as an electronic watermark, in main information including a plurality of performance data, the performance data including time information, the additional information being embedded in the form of a combination of changes of the time information of the plurality of performance data by changing the time information of the plurality of performance data in accordance with a value of the additional information and with a predetermined encoding algorithm, said apparatus comprising a processor adapted to:
- acquire decoding key information corresponding to the encoding algorithm; and
- inversely execute the encoding algorithm on the basis of the acquired decoding key information, to thereby decode the additional information hidden in the main information.

16. A machine-readable storage medium containing a group of instructions to cause said machine to implement a method of decoding additional information embedded, as an electronic watermark, in main information including a plurality of performance data, the performance data including time information, the additional information being embedded in the form of a combination of changes of the time information of the plurality of performance data by changing the time information of the plurality of performance data in accordance with a value of the additional information and with a predetermined encoding algorithm, said method comprising:

a step of acquiring decoding key information corresponding to the encoding algorithm; and a step of inversely executing the encoding algorithm on the basis of the decoding key information acquired by said step of acquiring, to thereby decode the additional information hidden in the main information.

17. A method of embedding additional information, as an electronic watermark, in main information including music performance data, the music performance data including status information indicative of respective statuses of individual ones of the performance data, said method comprising a step of making control as to whether a particular one of the statuses should be used or not, the particular status being a status use/non-use of which has no significant influence on execution of a music performance, wherein an electronic watermark corresponding to the use/non-use of the particular status is embedded in the main information.

18. A method as claimed in claim 17 wherein said electronic watermark corresponding to said use/non-use of said particular status constitutes one-bit information.

19. An apparatus for embedding additional information, as an electronic watermark, in main information including music performance data, the music performance data including status information indicative of respective statuses of individual ones of the performance data, said apparatus comprising a processor adapted to make control as to whether a particular one of the statuses should be used or not, the particular status being a status use/non-use of which has no significant influence on execution of a music performance, wherein an electronic watermark corresponding to the use/non-use of the particular status is embedded in the main information.

20. A machine-readable storage medium containing a group of instructions to cause said machine to implement a method of embedding additional information, as an electronic watermark, in main information including music performance data, the music performance data including status information indicative of respective statuses of individual ones of the performance data, said method comprising a step of making control as to whether a particular one of the statuses should be used or not, the particular status being a status use/non-use of which has no significant influence on execution of a music performance, wherein an electronic watermark corresponding to the use/non-use of the particular status is embedded in the main information.

21. A method of decoding additional information embedded, as an electronic watermark, in main information including music performance data, the music performance data including status information indicative of respective statuses of individual ones of the performance data, the additional information having a value depending on whether the status information of a particular status among the status information included in the music performance data is to be used or not, said method comprising:

a step of acquiring decoding key information; and a step of decoding the additional information by determining, on the basis of the decoding key information acquired by said step of acquiring, whether or not the particular status information is being used in the main information.

22. A method as claimed in claim 21 wherein said additional information constitutes one-bit information depending on whether the status information of said particular status among the status information included in the music performance data is to be used or not.

23. An apparatus for decoding additional information embedded, as an electronic watermark, in main information including music performance data, the music performance data including status information indicative of respective statuses of individual ones of the performance data, the additional information having a value depending on whether the status information of a particular status among the status information included in the music performance data is to be used or not, said apparatus comprising a processor adapted to:

acquire decoding key information; and decode the additional information by determining, on the basis of the acquired decoding key information, whether or not the particular status information is being used in the main information.

24. A machine-readable storage medium containing a group of instructions to cause said machine to implement a method of decoding additional information embedded, as an electronic watermark, in main information including music performance data, the music performance data including status information indicative of respective statuses of individual ones of the performance data, the additional information having a value depending on whether the status information of a particular status among the status information included in the music performance data is to be used or not, said method comprising:

a step of acquiring decoding key information; and a step of decoding the additional information by determining, on the basis of the decoding key information acquired by said step of acquiring, whether or not the particular status information is being used in the main information.

25. A method of embedding additional information, as an electronic watermark, in main information including music performance data, the main information including non-performance data in addition to the music performance data, the non-performance data including text data, said method comprising a step of controlling a number of spaces in the text data included in the non-performance data, wherein the electronic watermark of a value corresponding to the number of spaces is embedded in the main information.

26. A method as claimed in claim 25 wherein said step of controlling controls a number of spaces between adjoining words in the text data included in the non-performance data, to thereby embed an electronic watermark of a value corresponding to the number of spaces.

27. An apparatus for embedding additional information, as an electronic watermark, in main information including music performance data, the main information including non-performance data in addition to the music performance data, the non-performance data including text data, said apparatus comprising a processor adapted to control a number of spaces in the text data included in the non-performance data, wherein an electronic watermark of a value corresponding to the number of spaces is embedded in the main information.

28. A machine-readable storage medium containing a group of instructions to cause said machine to implement a method of embedding additional information, as an electronic watermark, in main information including music performance data, the main information including non-performance data in addition to the music performance data, the non-performance data including text data, said method comprising a step of controlling a number of spaces in the text data included in the non-performance data, wherein an electronic watermark of a value corresponding to the number of spaces is embedded in the main information.

29. A method of decoding additional information embedded, as an electronic watermark, in main information including music performance data, the main information including non-performance data in addition to the music performance data, the non-performance data including text data, the additional information constituting information corresponding to a number of spaces in the text data included in the non-performance data by controlling the number of spaces in the text data, said method comprising:

a step of acquiring decoding key information; and a step of decoding the additional information by determining the number of spaces in the text data included in the non-performance data on the basis of the decoding key information acquired by said step of acquiring.

30. An apparatus for decoding additional information embedded, as an electronic watermark, in main information including music performance data, the main information including non-performance data in addition to the music performance data, the non-performance data including text data, the additional information constituting information corresponding to a number of spaces in the text data included in the non-performance data by controlling the number of spaces in the text data, said apparatus comprising a processor adapted to:

acquire decoding key information; and decode the additional information by determining the number of spaces in the text data included in the non-performance data on the basis of the acquired decoding key information.

31. A machine-readable storage medium containing a group of instructions to cause said machine to implement a method of decoding additional information embedded, as an electronic watermark, in main information including music performance data, the main information including non-performance data in addition to the music performance data, the non-performance data including text data, the additional information constituting information corresponding to a number of spaces in the text data included in the non-performance data by controlling the number of spaces in the text data, said method comprising:

a step of acquiring decoding key information; and a step of decoding the additional information by determining the number of spaces in the text data included in the non-performance data on the basis of the decoding key information acquired by said step of acquiring.

32. An electronic information processing method of embedding additional information, as an electronic watermark, in main information including music performance data, said electronic information processing method comprising a step of adding dummy data to the main information in accordance with a predetermined encoding algorithm, wherein an electronic watermark corresponding to the dummy data added to the main information is embedded in the main information.

33. A method as claimed in claim 32 wherein said step of adding dummy data adds, right after given performance control data or non-performance control data, the same performance control data or non-performance control data as the dummy data to the main information.

34. A method as claimed in claim 32 wherein the dummy data is accompanied by time information, and desired additional information is embedded as an electronic watermark by setting the time information of the dummy data in accordance with the desired additional information.

35. A method as claimed in claim 32 wherein said step of adding dummy data sets a desired one of a plurality of tone generator channels as a dummy channel that is not used for tone generation, and wherein the electronic watermark of a value corresponding to the set dummy channel is embedded in the main information.

36. An electronic information processing apparatus for embedding additional information, as an electronic watermark, in main information including music performance data, said electronic information processing apparatus comprising a processor adapted to add dummy data to the main information in accordance with a predetermined encoding algorithm, wherein an electronic watermark corresponding to the dummy data added to the main information is embedded in the main information.

37. A machine-readable storage medium containing a group of instructions to cause said machine to implement a method of embedding additional information, as an electronic watermark, in main information including music performance data, said method comprising a step of adding dummy data to the main information in accordance with a predetermined encoding algorithm, wherein an electronic watermark corresponding to the dummy data added to the main information is embedded in the main information.

38. A method of decoding additional information embedded, as an electronic watermark, in main information including music performance data, the additional information being embedded in the main information as dummy data in accordance with a predetermined encoding algorithm, said method comprising:

a step of acquiring decoding key information corresponding to the encoding algorithm; and a step of decoding the additional information hidden in the main information by inversely executing the encoding algorithm on the basis of the decoding key information acquired by said step of acquiring.

39. An apparatus for decoding additional information embedded, as an electronic watermark, in main information including music performance data, the additional information being embedded in the main information as dummy data in accordance with a predetermined encoding algorithm, said apparatus comprising a processor adapted to:

acquire decoding key information corresponding to the encoding algorithm; and decode the additional information hidden in the main information by inversely executing the encoding algorithm on the basis of the acquired decoding key information.

40. A machine-readable storage medium containing a group of instructions to cause said machine to implement a method of decoding additional information embedded, as an electronic watermark, in main information including music performance data, the additional information being embedded in the main information as dummy data in accordance with a predetermined encoding algorithm, said method comprising:

a step of acquiring decoding key information corresponding to the encoding algorithm; and a step of decoding the additional information hidden in the main information by inversely executing the encoding algorithm on the basis of the decoding key information acquired by said step of acquiring.

41. An electronic information processing method of embedding additional information, as an electronic watermark, in main information including music performance data, said electronic information processing method comprising a step of selectively changing values of a predetermined kind of data among the music performance data in such a manner that a statistical distribution of the predetermined kind of data presents a pattern changed in accordance with a value of additional information to be embedded, whereby the additional information is embedded as the electronic watermark with the statistical distribution of the predetermined kind of data presenting the changed pattern.

42. An electronic information processing apparatus for embedding additional information, as an electronic watermark, in main information including music performance data, said electronic information processing apparatus comprising a processor adapted to selectively change values of a predetermined kind of data among the music performance data in such a manner that a statistical distribution of the predetermined kind of data presents a pattern changed in accordance with a value of additional information to be embedded, whereby the additional information is embedded as the electronic watermark with the statistical distribution of the predetermined kind of data presenting the changed pattern.

43. A machine-readable storage medium containing a group of instructions to cause said machine to implement a method of embedding additional information, as an electronic watermark, in main information including music performance data, said method comprising a step of selectively changing values of a predetermined kind of data among the music performance data in such a manner that a statistical distribution of the predetermined kind of data presents a pattern changed in accordance with a value of additional information to be embedded, whereby the additional information is embedded as the electronic watermark with the statistical distribution of the predetermined kind of data presenting the changed pattern.

44. A method of decoding additional information embedded, as an electronic watermark, in main information including music performance data, the additional information being embedded as a change in a statistical distribution pattern of a predetermined kind of data included in the music performance data, said method comprising:

a step of acquiring decoding key information; and a step of, on the basis of the decoding key information acquired by said step of acquiring, determining said change in a statistical distribution pattern of a predetermined kind of data included in the music performance data, to thereby decode the additional information hidden in the main information.

45. An apparatus for decoding additional information embedded, as an electronic watermark, in main information including music performance data, the additional information being embedded as a change in a statistical distribution pattern of a predetermined kind of data included in the music performance data, said apparatus comprising a processor adapted to:

acquire decoding key information; and on the basis of the acquired decoding key information, determine said change in a statistical distribution pattern of a predetermined kind of data included in the music performance data, to thereby decode the additional information hidden in the main information.

46. A machine-readable storage medium containing a group of instructions to cause said machine to implement a method of decoding additional information embedded, as an electronic watermark, in main information including music performance data, the additional information being embedded as a change in a statistical distribution pattern of a predetermined kind of data included in the music performance data, said method comprising:

a step of acquiring decoding key information; and a step of, on the basis of the decoding key information acquired by said step of acquiring, determining said change in a statistical distribution pattern of a predetermined kind of data included in the music performance data, to thereby decode the additional information hidden in the main information.

47. An electronic information processing method of embedding additional information, as an electronic watermark, in main information, said electronic information processing method comprising a step of embedding a plurality of pieces of electronic watermark information in relation to a single item of additional information, wherein an electronic watermark of a single item of additional information is embedded in the form of a plurality of pieces of electronic watermark information related to each other.

48. A method as claimed in claim 47 wherein said step of embedding embeds one of the pieces of electronic watermark information per divided additional information portion that is obtained by dividing, into a plurality of portions, the single item of additional information to be embedded.

49. A method as claimed in claim 47 wherein said step of embedding includes:

a first step of embedding at least a part of the additional information as first electronic watermark information in the main information in accordance with a predetermined first encoding algorithm; and a second step of embedding decoding key information, corresponding to said first encoding algorithm, as second electronic watermark information in the main information.

50. A method as claimed in claim 49 wherein said step of embedding further includes a third step of embedding, as third electronic watermark information, key information for decoding said second electronic watermark information.

51. An electronic information processing apparatus for embedding additional information, as an electronic watermark, in main information, said electronic information processing apparatus comprising a processor adapted to embed a plurality of pieces of electronic watermark information in relation to a single item of additional information, wherein an electronic watermark of a single item of additional information is embedded in the form of a plurality of pieces of electronic watermark information related to each other.

52. A machine-readable storage medium containing a group of instructions to cause said machine to implement a method of embedding additional information, as an electronic watermark, in main information, said method comprising a step of embedding a plurality of pieces of electronic watermark information in relation to a single item of additional information, wherein an electronic watermark of a single item of additional information is embedded in the form of a plurality of pieces of electronic watermark information related to each other.

53. A method of decoding additional information embedded as an electronic watermark in main information, a single item of additional information being embedded in the main information as a plurality of pieces of electronic watermark information related to each other, said method comprising:

a step of decoding the plurality of pieces of electronic watermark information from the main information; and a step of combining the pieces of electronic watermark information decoded by said step of decoding, to thereby provide the single item of additional information.

54. An apparatus for decoding additional information embedded as an electronic watermark in main information, a single item of additional information being embedded in the main information as a plurality of pieces of electronic watermark information related to each other, said apparatus comprising a processor adapted to:

decode the plurality of pieces of electronic watermark information from the main information; and combine the decoded pieces of electronic watermark information, to thereby provide the single item of additional information.

55. A machine-readable storage medium containing a group of instructions to cause said machine to implement a method of decoding additional information embedded as an electronic watermark in main information, a single item of additional information being embedded in the main information as a plurality of pieces of electronic watermark information related to each other, said method comprising:

a step of decoding the plurality of pieces of electronic watermark information from the main information; and a step of combining the pieces of electronic watermark information decoded by said step of decoding, to thereby provide the single item of additional information.

56. A method of decoding additional information embedded as an electronic watermark in main information, at least a part of the additional information being embedded as first electronic watermark information in the main information in accordance with a predetermined first encoding algorithm, decoding key information, corresponding to said first encoding algorithm, being embedded as second electronic watermark information in the main information, said method comprising:

a step of decoding said second electronic watermark information from the main information; and a step of decoding said first electronic watermark information from the main information using, as the decoding key information, said second electronic watermark information decoded by said step of decoding.

57. An apparatus for decoding additional information embedded as an electronic watermark in main information, at least a part of the additional information being embedded as first electronic watermark information in the main information in accordance with a predetermined first encoding algorithm, decoding key information, corresponding to said first encoding algorithm, being embedded as second electronic watermark information in the main information, said apparatus comprising a processor adapted to:

decode said second electronic watermark information from the main information; and decode said first electronic watermark information from the main information using, as the decoding key information, said second electronic watermark information decoded by said step of decoding.

58. A machine-readable storage medium containing a group of instructions to cause said machine to implement a method of decoding additional information embedded as an electronic watermark in main information, at least a part of the additional information being embedded as first electronic watermark information in the main information in accordance with a predetermined first encoding algorithm, decoding key information, corresponding to said first encoding algorithm, being embedded as second electronic watermark information in the main information, said method comprising:

a step of decoding said second electronic watermark information from the main information; and a step of decoding said first electronic watermark information from the main information using, as the decoding key information, said second electronic watermark information decoded by said step of decoding.

59. A machine-readable storage medium containing a group of data including additional information embedded, as an electronic watermark, in main information including a plurality of data, said group of data being usable by said machine, wherein said group of data includes the electronic watermark of the additional information embedded in the form of a change in arrangement or order of the data in the main information without values of the data in the main information themselves being changed, the change in the arrangement or order of the data in the main information being made in accordance with a value of the additional information and with a predetermined encoding algorithm.

60. A machine-readable storage medium containing a group of data including additional information embedded, as an electronic watermark, in main information including a plurality of performance data, said group of data being usable by said machine, wherein said group of data includes the electronic watermark of the additional information embedded in the form of a combination of changes of time information of the plurality of performance data, the changes of time information of the plurality of performance data in the main information being made in accordance with a value of the additional information and with a predetermined encoding algorithm.

61. A machine-readable storage medium containing a group of data including additional information embedded, as an electronic watermark, in main information including music performance data, said group of data being usable by said machine, the music performance data including status information indicative of respective statuses of individual ones of the performance data, wherein said group of data includes a one-bit electronic watermark, corresponding to use/non-use of a particular one of the statuses, embedded in the main information, and wherein the particular status is a status use/non-use of which has no significant influence on execution of a music performance.

62. A machine-readable storage medium containing a group of data including additional information embedded, as an electronic watermark, in main information including music performance data, said group of data being usable by said machine, the main information including non-performance data in addition to the music performance data, the non-performance data including text data, wherein said group of data includes an electronic watermark of a value, corresponding to a number of spaces in the text data included in the non-performance data, embedded in the main information by controlling the number of the spaces in the text data.

63. A machine-readable storage medium containing a group of data including additional information embedded, as an electronic watermark, in main information including music performance data, said group of data being usable by said machine, wherein said group of data includes an electronic watermark, corresponding to dummy data added to the main information, embedded in the main information in accordance with a predetermined encoding algorithm.

64. A machine-readable storage medium containing a group of data including additional information embedded, as an electronic watermark, in main information including music performance data, said group of data being usable by said machine, wherein in said group of data, values of a predetermined kind of data among the music performance data are selectively changed in such a manner that a statistical distribution of the predetermined kind of data presents a pattern changed in accordance with a value of additional information to be embedded, whereby the additional information is embedded as the electronic watermark with the statistical distribution of the predetermined kind of data presenting the changed pattern.

65. A machine-readable storage medium containing a group of data including additional information embedded, as an electronic watermark, in main information including music performance data, said group of data being usable by said machine, wherein said group of data includes a plurality of pieces of electronic watermark information, related to each other to represent a single item of additional information, embedded in the main information.

\* \* \* \* \*